United States Patent
Garcia et al.

(10) Patent No.: US 12,238,122 B2
(45) Date of Patent: Feb. 25, 2025

(54) METHOD AND SYSTEM FOR MACHINE LEARNING MODEL GENERATION AND ANOMALOUS EVENT DETECTION

(71) Applicant: Verizon Patent and Licensing Inc., Basking Ridge, NJ (US)

(72) Inventors: Scott M Garcia, Flower Mound, TX (US); James Pawloski, Allen, TX (US); Kevin Marion, Plano, TX (US); Ravichandren Krishnanandam, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 17/991,863

(22) Filed: Nov. 22, 2022

(65) Prior Publication Data
US 2024/0171594 A1   May 23, 2024

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC .. H04L 63/1416; H04L 41/16; H04L 63/1425
See application file for complete search history.

(56) References Cited

U.S. PATENT DOCUMENTS

| 12,088,600 B1 * | 9/2024 | Beauchesne | G06N 5/01 |
| 2023/0260019 A1 * | 8/2023 | De Oliveira | G06Q 40/03 |
| | | | 705/38 |

* cited by examiner

*Primary Examiner* — Huan V Doan

(57) ABSTRACT

One or more computing devices, systems, and/or methods for machine learning model generation and/or anomalous event detection are provided. In an example, one or more datasets having first fields are identified. Significance scores associated with the first fields are determined. Second fields are selected from the first fields based upon the significance scores. Field combinations are generated based upon the second fields. Based upon the field combinations, a plurality of machine learning models is generated. The plurality of machine learning models include a first machine learning model associated with a first field combination of the field combinations, and a second machine learning model associated with a second field combination of the field combinations. The plurality of machine learning models is deployed in a data monitoring pipeline. Using the plurality of machine learning models, an anomalous event is detected based upon data passing through the real-time data monitoring pipeline.

20 Claims, 17 Drawing Sheets

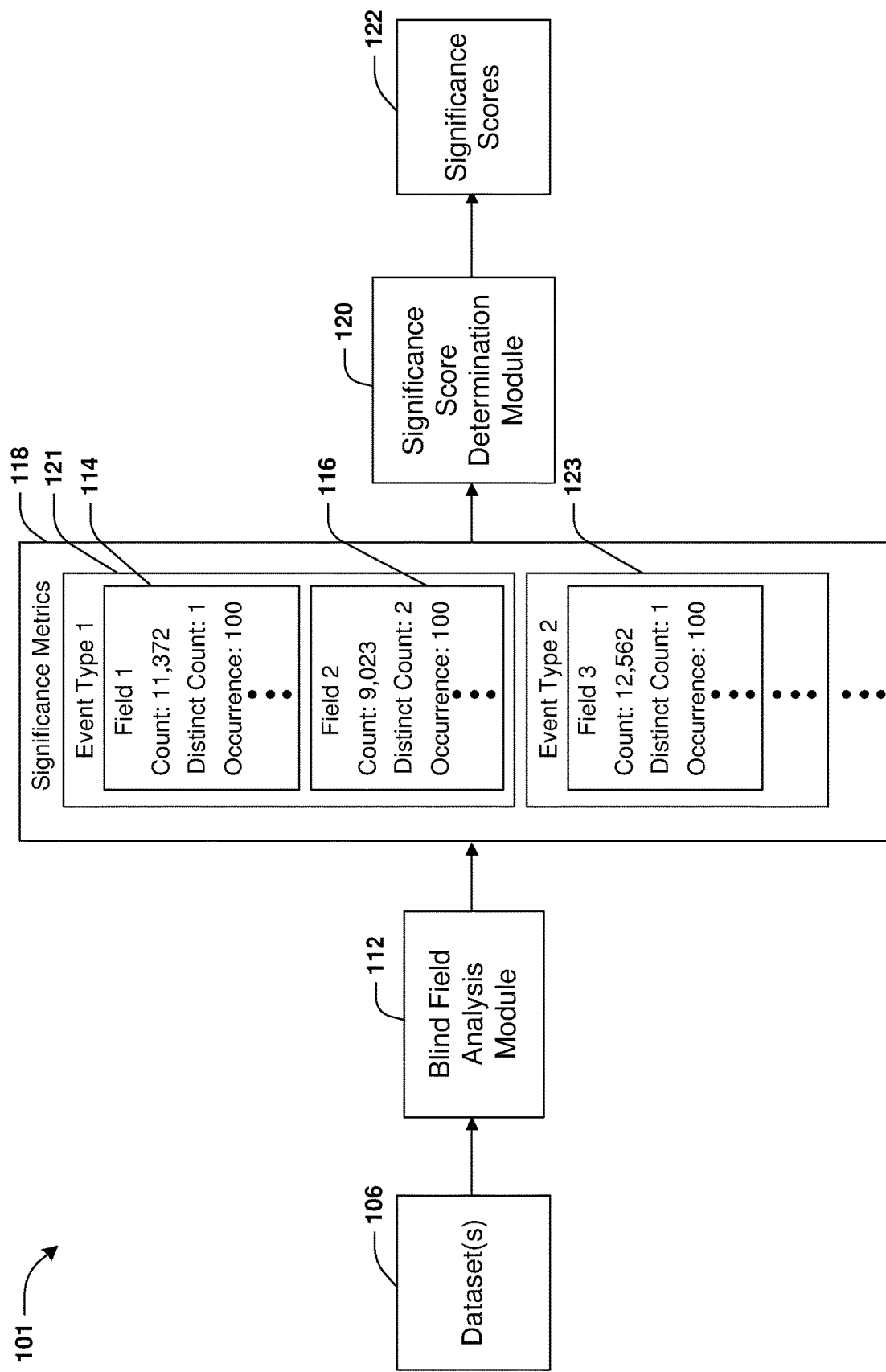

| orig_index ⬥ | eventtype ⬥ | field ⬥ | type ⬥ | count ⬥ | distinct_count ⬥ | field_occur_per ⬥ | mean ⬥ | stdev ⬥ | margin_of_error ⬥ |
|---|---|---|---|---|---|---|---|---|---|
| aaa | netco-ise-authentication | x_status | categorical | 11372 | 1 | 100.00 | none | none | 0 |
| aaa | netco-ise-authentication | vendor_action | categorical | 11372 | 2 | 100.00 | none | none | 0 |
| aaa | netco-ise-authentication | vendor | categorical | 11372 | 1 | 100.00 | none | none | 0 |
| aaa | netco-ise-authentication | signature | categorical | 11372 | 2 | 100.00 | none | none | 0 |
| aaa | netco-ise-authentication | server_type | categorical | 11372 | 2 | 100.00 | none | none | 0 |
| aaa | netco-ise-authentication | product | categorical | 11372 | 2 | 100.00 | none | none | 0 |
| aaa | netco-ise-authentication | log_type | categorical | 11372 | 2 | 100.00 | none | none | 0 |
| aaa | netco-ise-authentication | linecount | numeric | 11372 | 1 | 100.00 | 1 | 0 | 0.00 |

| _time ⇅ | eventtype ⇅ | model_name ⇅ | type ⇅ | orig_index ⇅ | field ⇅ | unique_fields ⇅ | events ⇅ |
|---|---|---|---|---|---|---|---|
| 2022-04-22 12:39:00 | winsystem | stage_four_winsystem | numeric | winOS | EventCode<br>EventType<br>RecordNumber<br>SidType<br>TaskCategory<br>category<br>linecount | 7 | 10404 |
| 2022-04-22 01:25:00 | netco-ise-passed-authentication | stage_four_netco_ise_passed_authentication | numeric | aaa | DestinationPort<br>Framed_MTU<br>MESSAGE_CODE<br>NAS_Port<br>Name<br>Port<br>Privilege_Level<br>Proxy_State<br>RadiusFlowType<br>RequestLatency<br>Step<br>dest_port<br>linecount<br>port | 14 | 9840 |

| updated ◆ | model_name ◆ | title ◆ |
|---|---|---|
| 2022-04-22T12:40:06+00:00 | stage_four_winsystem | __mlspl_stage_four_winsystem_PCA.mlmodel __mlspl_stage_four_winsystwm_XMeans.mlmodel |
| 2022-04-22T12:35:10+00:00 | stage_four_winsec | __mlspl_stage_four_winsec_PCA.mlmodel __mlspl_stage_four_winsec_XMeans.mlmodel |
| 2022-04-22T12:27:52+00:00 | stage_four_wineventlog_winOS | __mlspl_stage_four_wineventlog_winOS_PCA.mlmodel __mlspl_stage_four_wineventlog_winOS_XMeans.mlmodel |
| 2022-04-22T12:19:37+00:00 | stage_four_wineventlog_system | __mlspl_stage_four_wineventlog_system_PCA.mlmodel __mlspl_stage_four_wineventlog_system_XMeans.mlmodel |
| 2022-04-22T12:16:08+00:00 | stage_four_wineventlog_security | __mlspl_stage_four_wineventlog_security_PCA.mlmodel __mlspl_stage_four_wineventlog_security_XMeans.mlmodel |
| 2022-04-22T12:04:39+00:00 | stage_four_winOS_time_sync | __mlspl_stage_four_winOS_time_sync_PCA.mlmodel __mlspl_stage_four_winOS_time_sync_XMeans.mlmodel |
| 2022-04-22T11:53:55+00:00 | stage_four_winOS_ticket_renewed | __mlspl_stage_four_winOS_ticket_renewed_PCA.mlmodel __mlspl_stage_four_winOS_ticket_renewed_XMeans.mlmodel |

FIG. 5

METHOD AND SYSTEM FOR MACHINE LEARNING MODEL GENERATION AND ANOMALOUS EVENT DETECTION

BACKGROUND

Many systems use machine learning models for various actions such as classification, regression, clustering, etc. However, the cost of using machine learning models may be prohibitive in many applications, due, at least in part, to the large amount of manual effort required to create machine learning models.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1B is a diagram illustrating an example system for anomalous event detection using machine learning models, where significance scores associated with fields are determined according to some embodiments.

FIG. 3 illustrates a table associated with various fields according to some embodiments.

FIG. 4 illustrates a table associated with various field combinations according to some embodiments.

FIG. 5 illustrates a table associated with various machine learning models according to some embodiments.

DETAILED DESCRIPTION OF EXAMPLE EMBODIMENTS

Figure 1A:
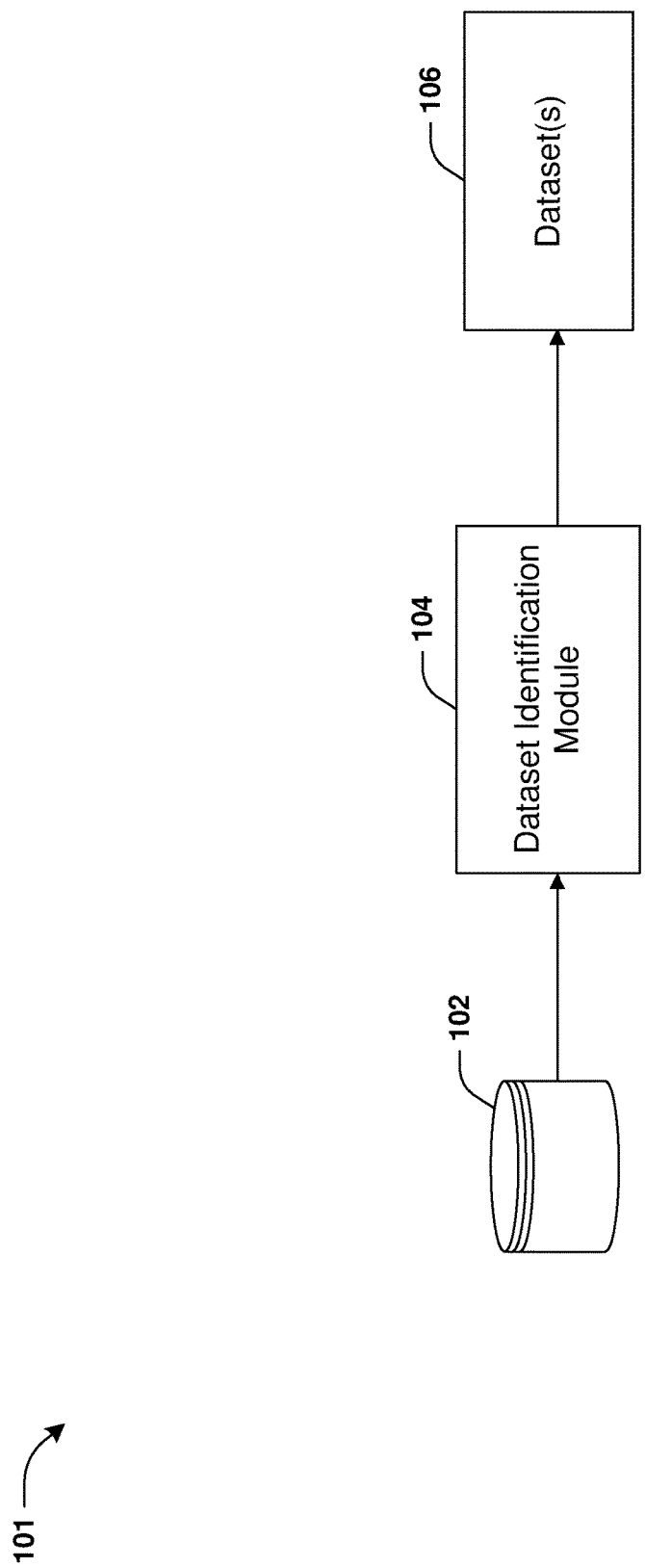
FIG. 1A is a diagram illustrating an example system for anomalous event detection using machine learning models, where one or more datasets are identified according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for machine learning model generation and/or anomalous event detection are provided. Many systems use machine learning models for various actions such as classification, regression, clustering, etc. However, the cost of machine learning models may be prohibitive in many applications, due, at least in part, to the large amount of manual effort required to create machine learning models. For example, some systems require human input and/or manual effort to (i) normalize data to be used in training the machine learning models, and/or (ii) provide the machine learning models with context by way of defining different types of data for use in generating and/or deploying a machine learning model. The human input and/or manual effort may require large amounts of manpower and/or may be time consuming. Further, some applications, such as cyber security (e.g., cyber threat detection), rely upon large amounts of data (which increase over time) that has exceeded human capability to effectively analyze for use in creating functioning machine learning models. Thus, in human dependent systems, it may be impossible to create machine learning models for these applications, and, in cases where it may be possible, creation of the machine learning models may rely upon large amounts (e.g., weeks, months, etc.) of manual development work. Subsequently, ad-hoc machine learning models are created and run for particular areas of concern in an enterprise, but these narrow models do not tend to be useful or applicable to other areas and cannot be reused. Further, creating machine learning models using human input causes the created machine learning models to have a human bias that can influence results in unintended ways leading to inaccurate and/or misinterpreted results.

Thus, in accordance with one or more of the techniques herein, a plurality of machine learning models may be generated automatically and/or autonomously, thereby providing for reduced manual effort and/or increased accuracy (due, at least in part, to reduced and/or zero human bias introduced to the plurality of machine learning models). The plurality of machine learning models may be used for anomalous event detection, such as events associated with at least one of fraudulent activity, malware, cyber-attacks, operational misbehavior, network malfunctions, network outages, theft, embezzlement, misconduct, etc. in a system.

In some examples, data used to generate the plurality of machine learning models may be selected automatically. For example, blind field analysis may be performed on one or more datasets to (i) determine significance scores of first fields of the one or more datasets, and/or (ii) select second fields (e.g., significant fields to be used in generating the plurality of machine learning models) based upon the significance scores. Using the second fields, field combinations may be generated (e.g., automatically generated) based upon event types of events associated with the second fields. The plurality of machine learning models may be generated based upon the field combinations. For example, a first machine learning model may be generated based upon a first field combination (e.g., the first machine learning model may be trained using data units of fields of the first field combination), a second machine learning model may be generated based upon a second field combination (e.g., the second machine learning model may be trained using data units of fields of the second field combination), etc.

The plurality of machine learning models may be deployed in a data monitoring pipeline (e.g., a real-time data monitoring pipeline) in which anomalous events (e.g., anomalous network events) are detected by the plurality of machine learning models based upon data (e.g., real-time data) passing through the pipeline (e.g., the data passing through the pipeline may comprise network data indicative of one or more network events of a network). At least some of the plurality of machine learning models are arranged in parallel and/or at least some of the plurality of machine learning models are arranged in series, thereby forming a multi-tier machine learning model system that provides for improved machine learning model prediction and/or improved detection of anomalous events as compared to using a single-tier machine learning model.

Machine learning model outputs produced by at least some of the plurality of machine learning models over a period of time are analyzed to generate feedback. The feedback may be used to train and/or improve machine learning models of the plurality of machine learning models, thereby providing for improved anomalous event detection using the plurality of machine learning models.

Alternatively and/or additionally, correlations between machine learning model outputs of the plurality of machine learning models may be monitored and/or patterns associated with the machine learning model outputs and/or the correlations between the machine learning model outputs may be identified (via blind data correlation and/or blind behavioral analytics, for example). An anomalous event may be detected based upon a change (e.g., an unexpected change) in correlations between the (monitored) machine learning model outputs, such as where a difference between machine learning model outputs is different than an expected difference between the machine learning model outputs. Alternatively and/or additionally, an anomalous event may be detected based upon a difference between a pattern (e.g., an expected pattern) of behavior of outputs of the plurality of machine learning models and detected behavior of the outputs of the plurality of machine learning models.

It may be appreciated that generating machine learning models based upon the field combinations enables the plurality of machine learning models to analyze input data in the data monitoring pipeline from multiple perspectives (corresponding to the field combinations), thereby providing for improved (e.g., more accurate) anomalous event detection using the plurality of machine learning models (e.g., with reduced false positives). Alternatively and/or additionally, generating the plurality of machine learning models using the techniques provided herein may enable generation (e.g., automatic generation) of tens, hundreds, and/or thousands of machine learning models (arranged in series and/or parallel), some and/or all of which may be generated based upon different field combinations (associated with different perspectives, for example), thereby providing for improved (e.g., more accurate) anomalous event detection using the plurality of machine learning models (e.g., with reduced false positives). Alternatively and/or additionally, using the field combinations may result in the plurality of the machine learning models being more context aware.

In some examples, in response to detecting the anomalous event, one or more actions may be performed. The one or more actions may comprise one or more protective and/or corrective actions performed to prevent and/or mitigate at least one of a threat, a system failure, a malfunction, etc. associated with the anomalous event. In some examples, an anomalous event report may be transmitted to one or more devices. The anomalous event report may comprise information associated with the anomalous event, such as information indicative of identifiers of entities (e.g., at least one of users, accounts, devices, components, resources, etc.) associated with the anomalous event.

In an example, the anomalous event may be associated with fraudulent activity, malware, a cyber-attack, misconduct, operational misbehavior, etc. performed by one or more entities. The one or more actions (performed in response to detecting the anomalous event) may comprise (i) blocking the one or more entities from accessing one or more resources, (ii) reporting the one or more entities to law enforcement, (iii) deactivating infected computers, and/or (iv) removing malware installed on the infected computers.

In an example, the anomalous event may be associated with theft from one or more financial accounts by one or more entities. The one or more actions (performed in response to detecting the anomalous event) may comprise (i) blocking an illegitimate transfer from being performed, (ii) blocking a malicious entity associated with the anomalous event from accessing a financial account platform, (iii) blacklisting the financial account, (iv) deactivating the financial account, and/or (v) reporting the financial account to law enforcement. Performing the one or more protective actions may mitigate and/or prevent theft.

In an example, the anomalous event may be associated with a network outage and/or a malfunction of an entity in a network. The one or more actions (performed in response to detecting the anomalous event) may comprise (i) identifying a malfunctioning component in the network, (ii) deploying one or more resources to the malfunctioning component, and/or (iii) reconfiguring, repairing and/or replacing the malfunctioning component.

FIGS. 1A-1J illustrate examples of a system 101 for machine learning model generation (e.g., autonomous machine learning model generation) and/or anomalous event detection. In FIG. 1A, the system 101 may have data stored on one or more data stores 102 (e.g., a data lake), such as a repository (e.g., a centralized repository) that stores and/or secures structured data, semi-structured data and/or unstructured data. The data may be in its natural and/or raw format (e.g., the data may not be formatted and/or reformatted according to a specific format for storage on the one or more data stores 102). The one or more data stores 102 may be updated with new data. For example, new data from one or more data sources (associated with the system 101, for example) may be added for storage on the one or more data stores 102 in a periodic manner, an aperiodic manner, a continuous manner and/or a real-time manner (e.g., the data is stored on the one or more data stores 102 upon the data becoming available and/or in response to logging the data). Over time, new types of data with varying types of information, different formatting, and/or from different data sources, may be stored on the one or more data stores 102. In some examples, data stored on the one or more data stores 102 may comprise at least one of log data (e.g., log files), network flow data, intrusive detection data, data associated with endpoint tools, alerts, firewall data, alerts sent by firewalls, etc.

Figure 1C:
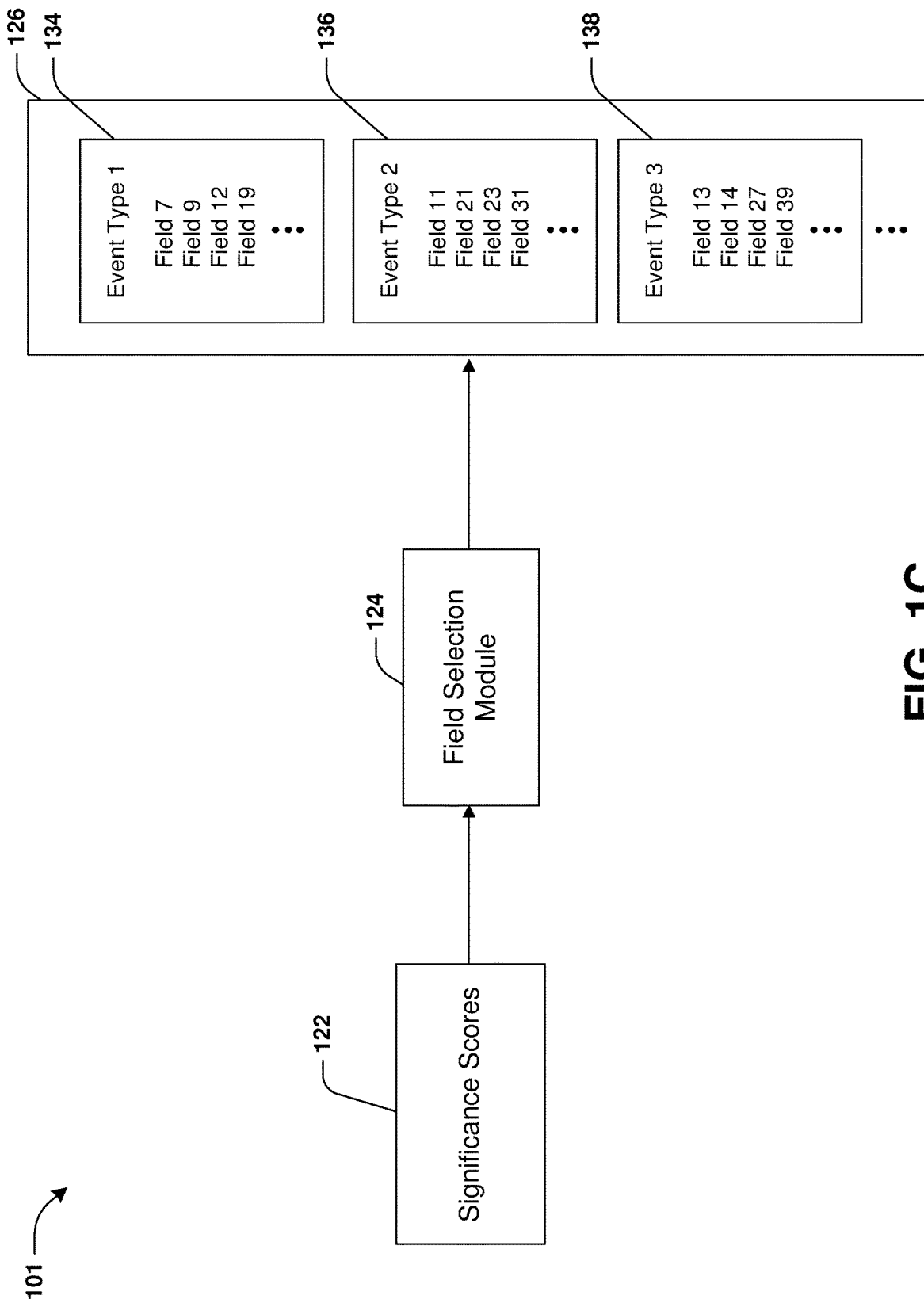
FIG. 1C is a diagram illustrating an example system for anomalous event detection using machine learning models, where second fields are selected from first fields based upon significance scores according to some embodiments.
Figure 1D:
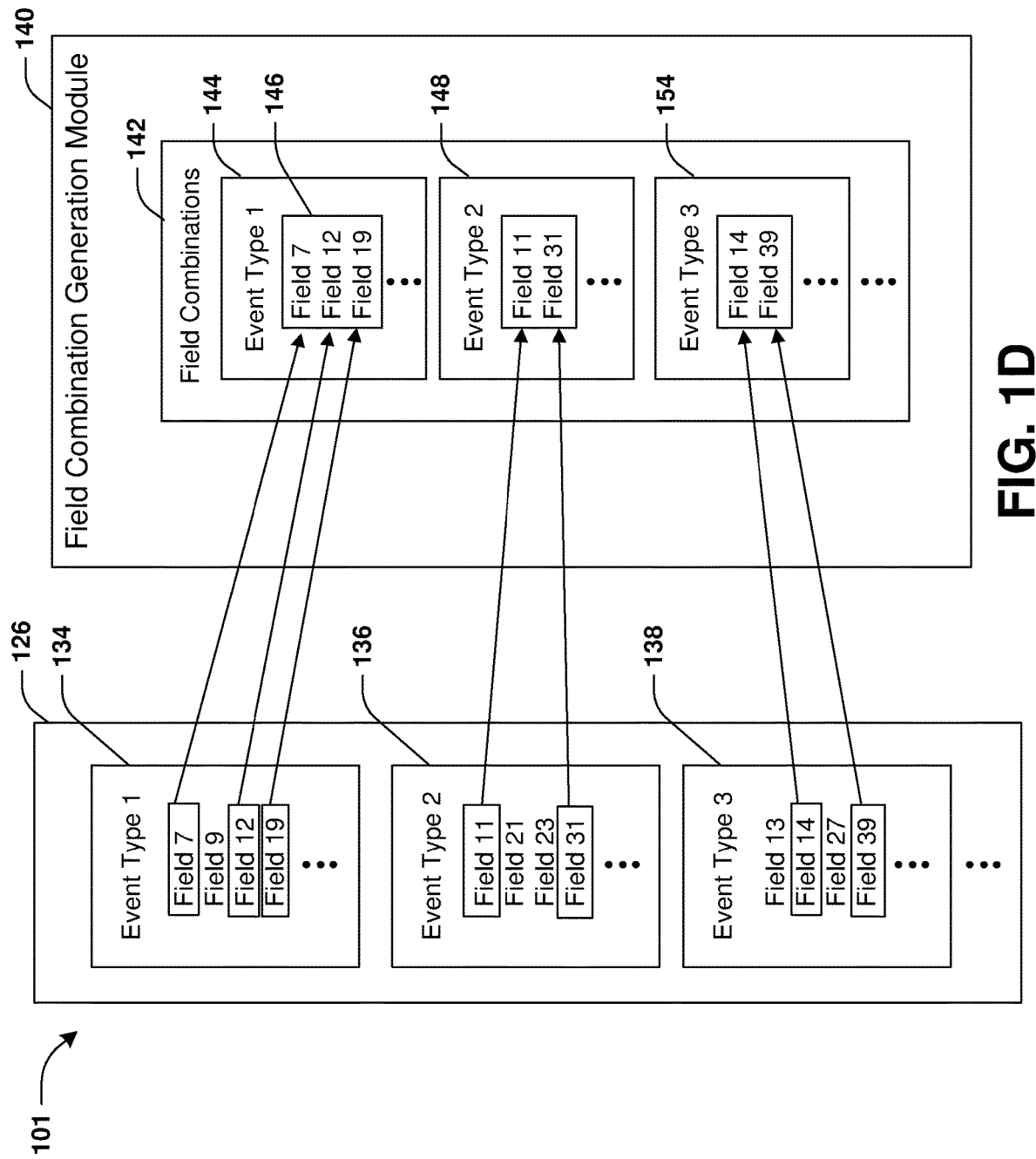
FIG. 1D is a diagram illustrating an example system anomalous event detection using machine learning models, where field combinations are generated according to some embodiments.
Figure 1E:
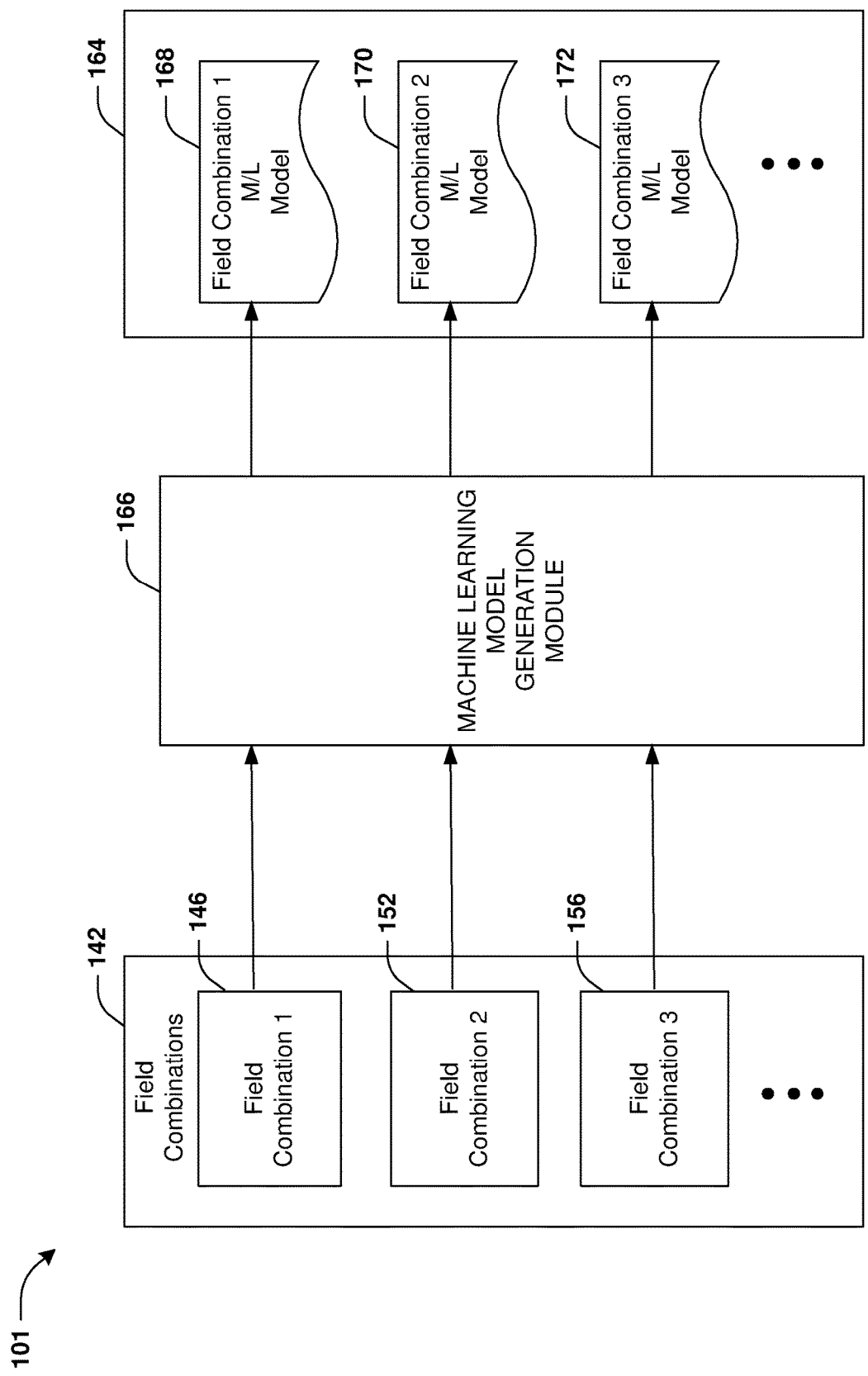
FIG. 1E is a diagram illustrating an example system anomalous event detection using machine learning models, where machine learning models are generated according to some embodiments.
Figure 1F:
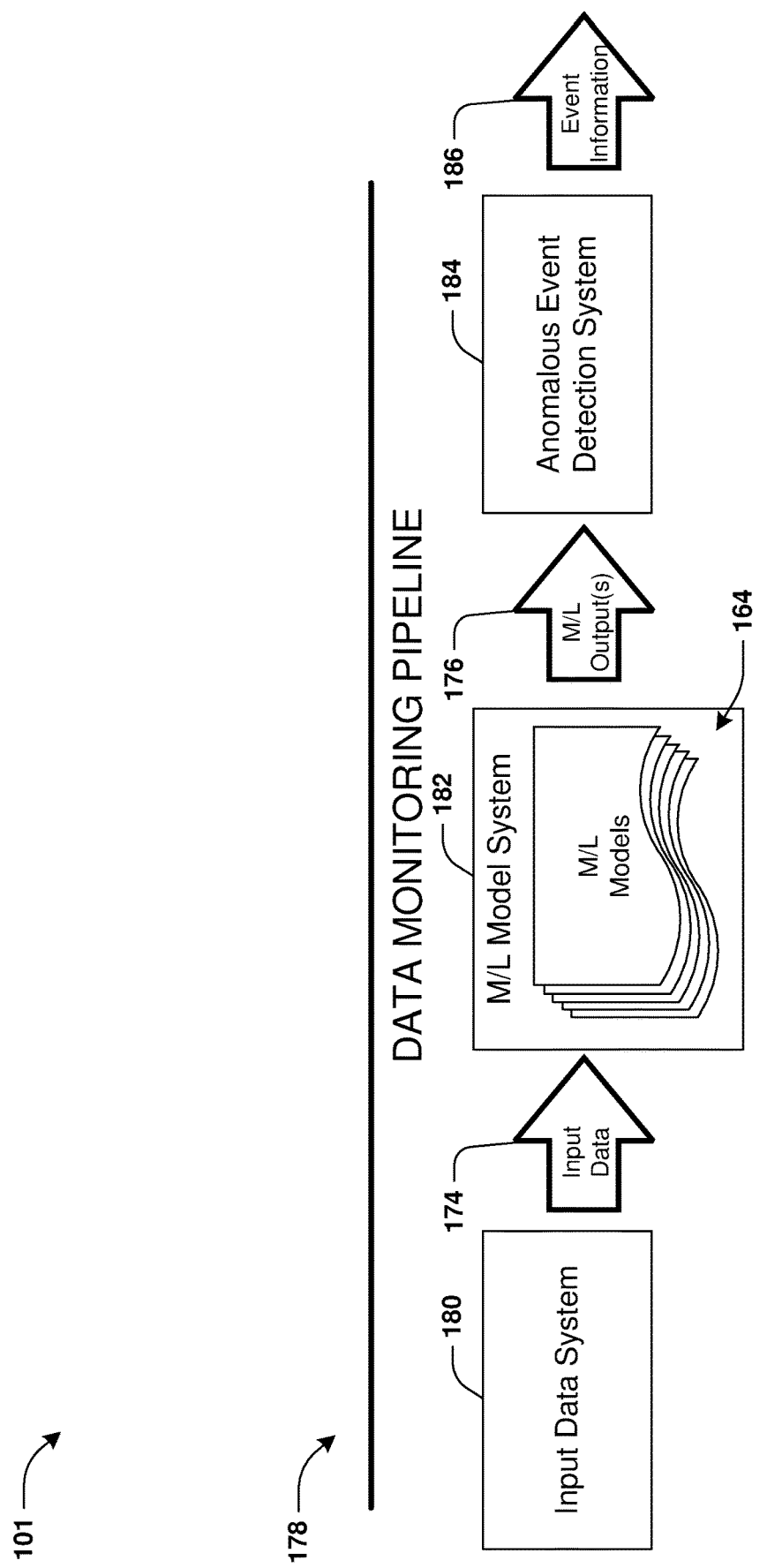
FIG. 1F is a diagram illustrating an example system anomalous event detection using machine learning models, where a plurality of machine learning models is deployed in a data monitoring pipeline according to some embodiments.
Figure 1G:
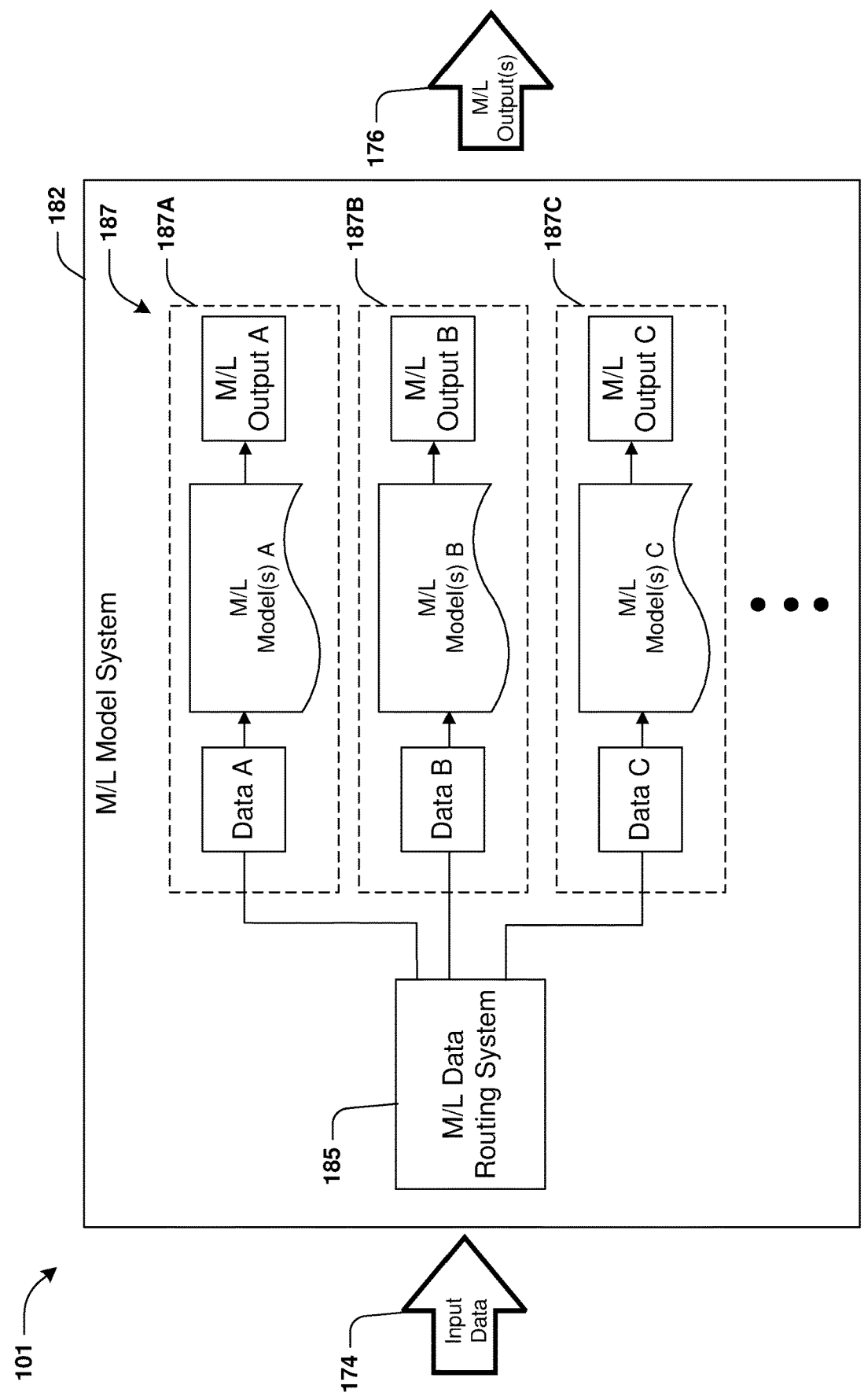
FIG. 1G is a diagram illustrating an arrangement of machine learning models in a machine learning model system according to some embodiments.
Figure 1H:
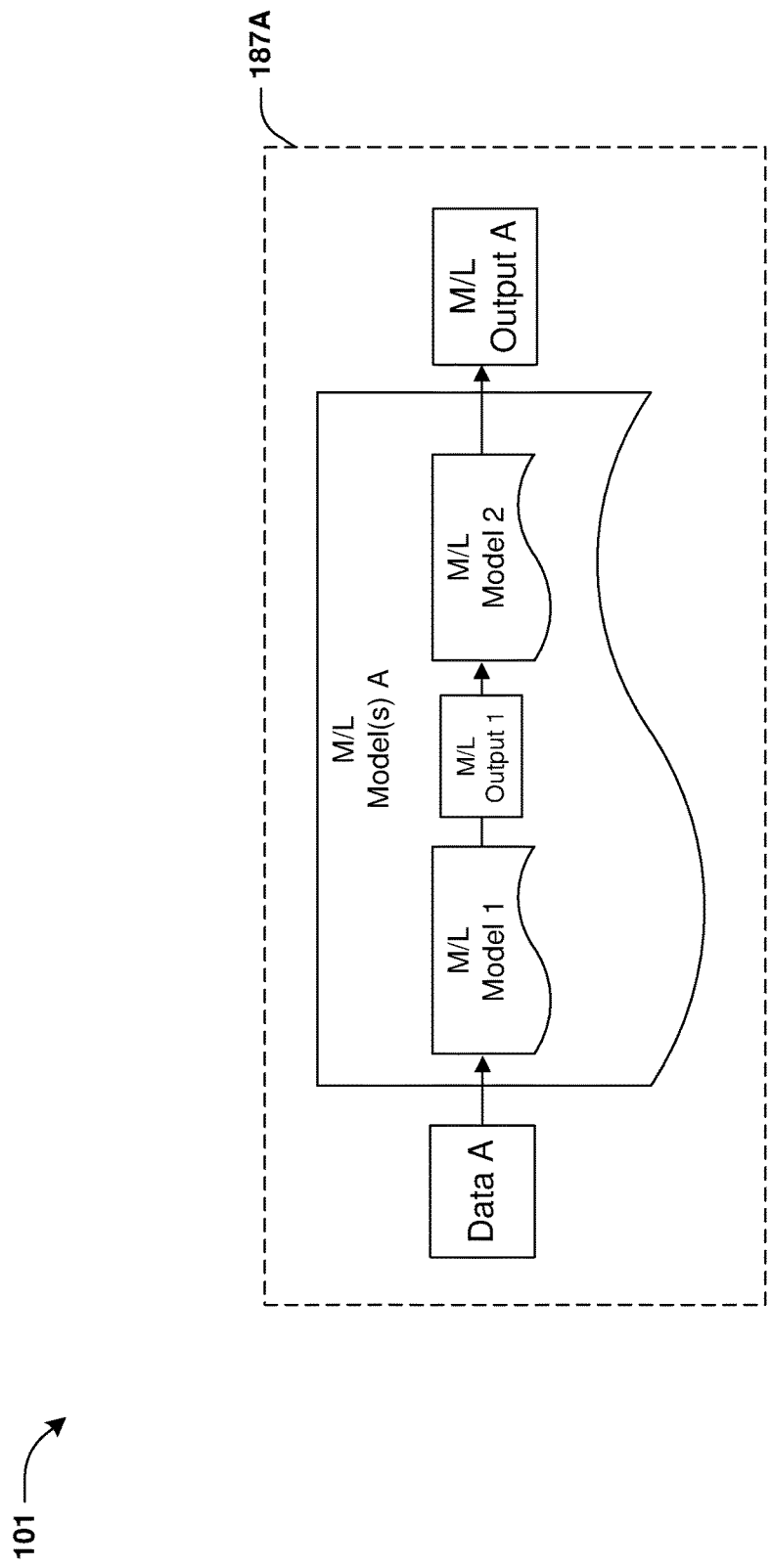
FIG. 1H is a diagram illustrating an arrangement of machine learning models in a machine learning model system according to some embodiments.
Figure 1I:
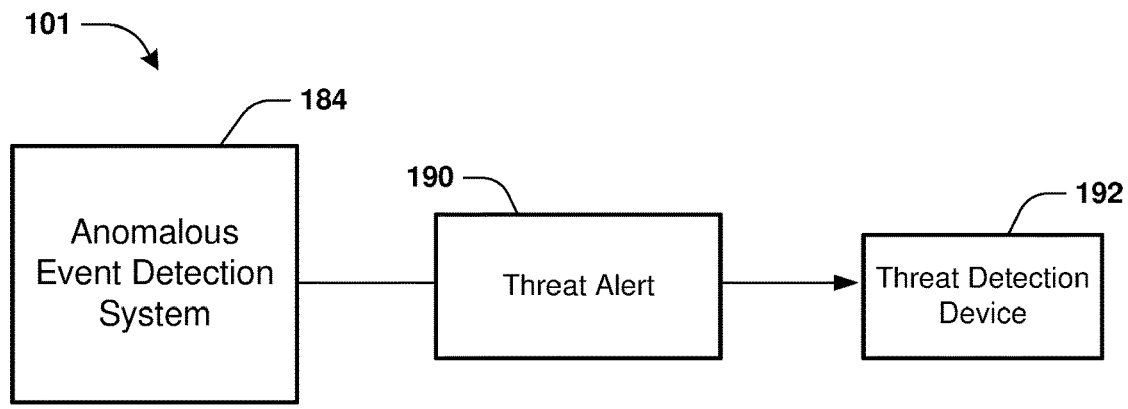
FIG. 1I is a diagram illustrating an example system anomalous event detection using machine learning models, where a threat alert is transmitted to a device according to some embodiments.
Figure 1J:
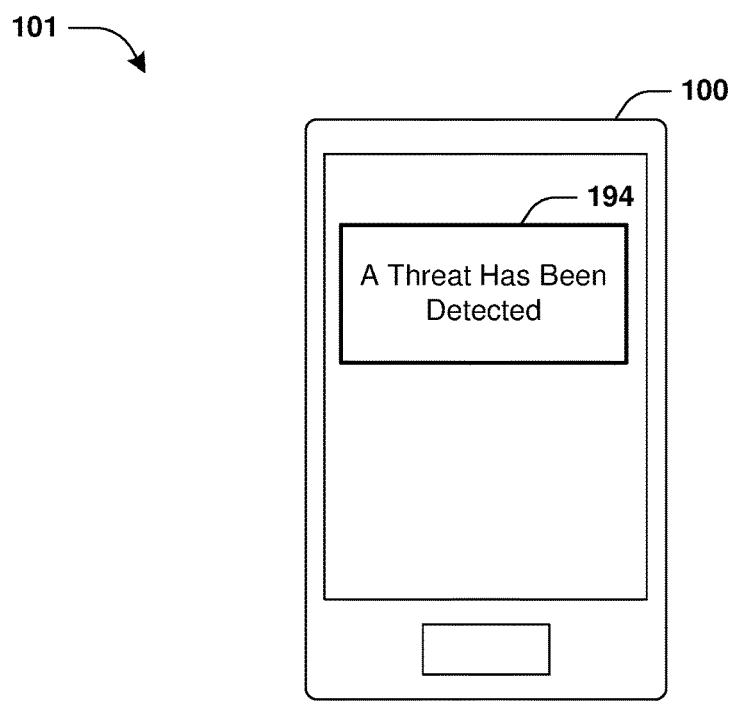
FIG. 1J is a diagram illustrating an example system anomalous event detection using machine learning models, where a threat notification is displayed via an interface on a device according to some embodiments.
Figure 2:
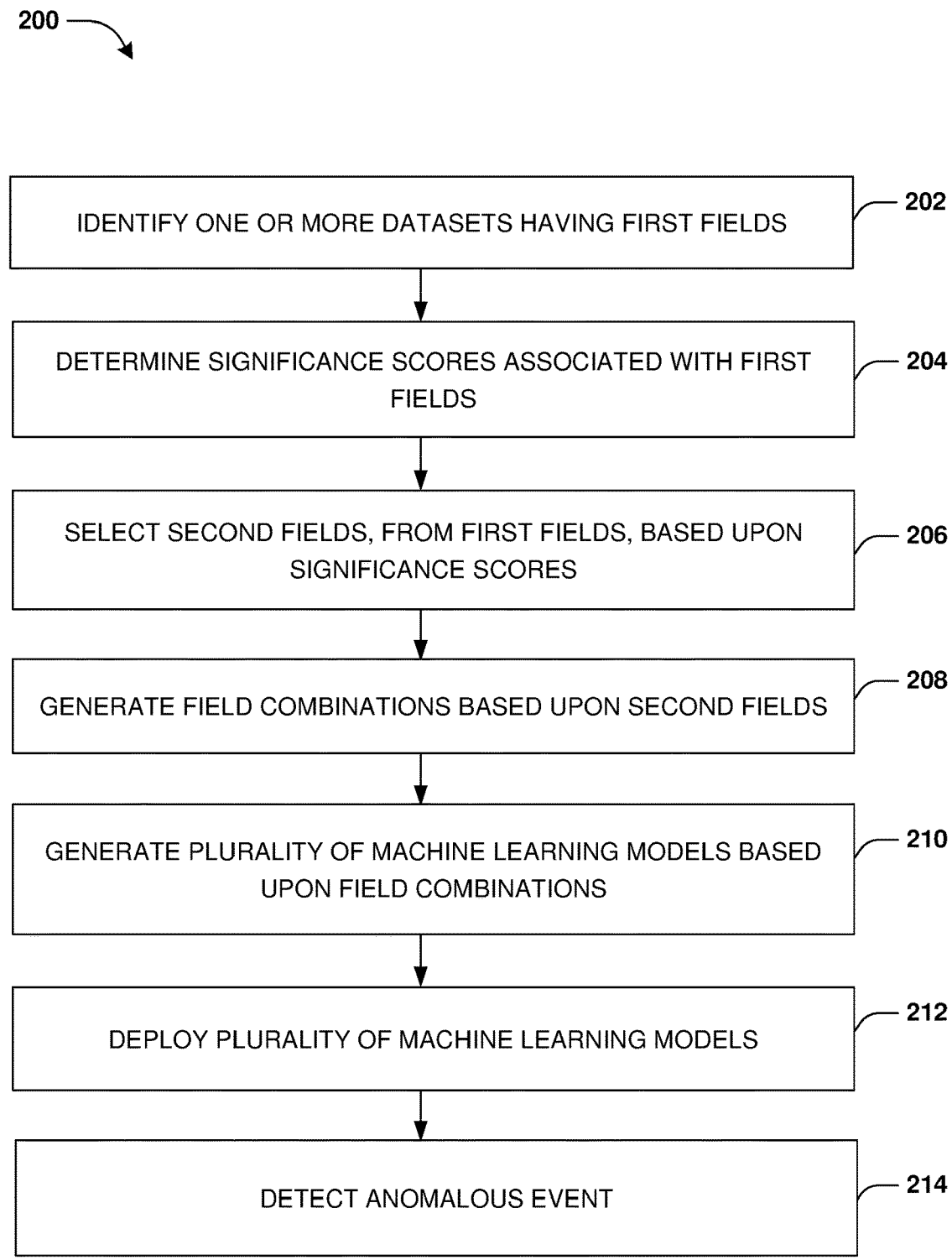
FIG. 2 is a flow chart illustrating an example method anomalous event detection using machine learning models according to some embodiments.

An embodiment of generating machine learning models and/or detecting anomalous events is illustrated by an exemplary method 200 of FIG. 2, and is further described in conjunction with the system 101 of FIGS. 1A-1J.

At 202, one or more datasets 106 (shown in FIG. 1A) stored on the one or more data stores 102 may be identified (by a dataset identification module 104, for example). The one or more datasets 106 may correspond to one or more indexes of the one or more data stores 102). The one or more datasets 106 may be selected for use in generating (e.g., automatically and/or autonomously generating) machine learning models for application in data monitoring and/or anomalous event detection (e.g., the machine learning models may be applied to data, such as real-time data, to monitor for and/or detect anomalous events).

In some examples, the one or more datasets 106 may be identified (e.g., selected from data stored on the one or more data stores 102) based upon one or more parameters received from a machine learning model management device. The one or more parameters may be received via a machine learning model management interface (e.g., an interface displayed on the machine learning model management device) associated with managing and/or configuring parameters for machine learning model generation.

In an example, the one or more parameters may comprise at least one of a period of time, a quantity of events, a measure of data, a quantity of datasets (e.g., a quantity of indexes), etc. For example, the one or more datasets 106 may be identified (e.g., selected) based upon a determination that the one or more datasets 106 are associated with (e.g., indicative of) events within the period of time. Alternatively and/or additionally, the one or more datasets 106 may be identified (e.g., selected) such that events associated with (e.g., indicated by) the one or more datasets 106 amount to at most the quantity of events. Alternatively and/or additionally, the one or more datasets 106 may be identified (e.g., selected) such that data of the one or more datasets 106 amounts to at most the measure of data (e.g., the measure of data may be a size, which may be measured in bytes, kilobytes, megabytes, gigabytes, terabytes, petabytes, etc.). Alternatively and/or additionally, the one or more datasets 106 may be identified (e.g., selected) such that a quantity of the one or more datasets 106 amounts to at most the quantity of datasets.

In some examples, one, some and/or all of the one or more parameters (e.g., at least one of the period of time, the quantity of events, the measure of data, etc.) are determined automatically, such as randomly. For example, the period of time, the quantity of events, the measure of data and/or the quantity of datasets may be determined using a random value generator (e.g., a true random value generator or a pseudo-random value generator).

In some examples, the measure of data, the quantity of events and/or the quantity of datasets may be based upon (e.g., limited by) physical compute resources allocated for (i) generating machine learning models using the one or more datasets 106, and/or (ii) using the machine learning models to monitor for and/or detect anomalous events. Thus, by selecting the one or more datasets 106 based upon the measure of data, the quantity of events and/or the quantity of datasets, the machine learning models may be generated and/or used without overloading and/or exceeding the allocated physical compute resources.

In some examples, a time duration (e.g., measured in minutes, hours, days, weeks, etc.) associated with the period of time is determined based upon the measure of data and/or the quantity of events. The quantity of events may be determined based upon the measure of data and/or an average measure of data per event associated with the one or more data stores 102. For example, the average measure of data per event may correspond to an average amount of data (e.g., an average size of data) occupied by information indicative of an event (e.g., an average size of data for indicating one event). The time duration may be determined based upon the quantity of events and/or a rate of events per unit of time (e.g., an average event per second rate) of events indicated by data stored in the one or more data stores 102.

In some examples, the quantity of events may be equal to the measure of data divided by the average measure of data per event, and the time duration may be equal to the quantity of events divided by the rate of events per unit of time. The period of time, which may span from a first time to a second time, may be determined (e.g., randomly) based upon the time duration. For example, a duration of the period of time may be at most the time duration. Data indicative of events between the first time and the second time may be extracted from the one or more data stores 102 for inclusion in the one or more datasets 106.

In some examples, randomly determining the period of time (and/or the quantity of events, the measure of data and/or the quantity of datasets) may provide for identification of the one or more datasets 106 while avoiding human bias. Accordingly, machine learning models generated using the one or more datasets 106 (using the techniques herein, for example) may be generated with reduced (and/or zero) human bias, as compared to the period of time being determined manually.

The one or more datasets 106 may have first fields, such as data attributes (e.g., unique data attributes). For example, a dataset of the one or more datasets 106 may comprise first data units associated with a first field, second data units associated with a second field, etc. The first fields may comprise at least one of numerical fields (e.g., fields associated with data units comprising numbers, such as integers, floating point numbers, etc.), categorical fields (e.g., fields associated with data units comprising strings, such as text strings), etc.

At 204, significance scores associated with the first fields may be determined. A significance score of the significance scores (e.g., each significance score of the significance scores) may be associated with a field of the first fields. For example, a first significance score of the significance scores may be associated with a first field of the first fields, a second significance score of the significance scores may be associated with a second field of the first fields, etc. The significance scores may be determined for use in selecting second fields (e.g., significant fields), from the first fields, for use in generating (e.g., autonomously generating) machine learning models, such as machine learning models for application in data monitoring and/or anomalous event detection (e.g., the machine learning models may be applied to data, such as real-time data, to monitor for and/or detect anomalous events). It may be appreciated that the significance scores may be determined and/or the second fields may be selected automatically, thereby providing for generation of machine learning models with reduced (and/or zero) human bias, as compared to the second fields being manually selected for use in generating the machine learning models.

FIG. 1B illustrates determination of the significance scores (shown with reference number 122). In some examples, the one or more datasets 106 may be input to a field analysis module 112 (e.g., blind field analysis module) configured to determine significance metrics 118 associated with the first fields. The field analysis module 112 may analyze (e.g., field analysis, such as blind field analysis) the one or more datasets 106 to determine the significance metrics 118. The significance metrics 118 may comprise one or more significance metrics for each field of the first fields, such as one or more first significance metrics 114 associated with a first field "Field 1" of the one or more datasets 106, one or more second significance metrics 116 associated with a second field "Field 2" of the one or more datasets 106, etc. In some examples, types of significance metrics of the one or more first significance metrics 114 may depend upon a field type of the first field.

For a categorical field of the first fields, the significance metrics 118 may comprise (i) a quantity of data units, associated with the categorical field, in the one or more datasets 106 (e.g., the count "11,372" in the one or more first significance metrics 114 may correspond to the quantity of data units in the one or more datasets 106 that are associated with the categorical field), (ii) a quantity of unique values that the categorical field has in the one or more datasets 106 (e.g., the distinct count "1" in the one or more first significance metrics 114 may indicate that the one or more datasets 106 comprise one unique type of data unit associated with the categorical field), and/or (iii) a measure of data population occurrences associated with the categorical field during the period of time (e.g., the occurrence "100" in the one or more first significance metrics 114 may indicate that the categorical field was populated with data 100 times during the period of time).

For a numerical field of the first fields, the significance metrics 118 may comprise (i) a quantity of data units, associated with the numerical field, in the one or more datasets 106 (e.g., the count "11,372"), (ii) a quantity of unique values that the numerical field has in the one or more datasets 106 (e.g., the distinct count "1"), (iii) a measure of data population occurrences associated with the numerical field during the period of time (e.g., the occurrence "100"), (iv) a mean of data units, associated with the numerical field, in the one or more datasets 106 (e.g., a mean of values indicated by the data units associated with the numerical field), (v) a median of data units, associated with the numerical field, in the one or more datasets 106 (e.g., a median of values indicated by the data units associated with the numerical field), (vi) a standard deviation of data units, associated with the numerical field, in the one or more datasets 106 (e.g., a standard deviation of values indicated by the data units associated with the numerical field), (vii) a variance coefficient of data units, associated with the numerical field, in the one or more datasets 106 (e.g., a variance coefficient of values indicated by the data units associated with the numerical field), (viii) a standard error of data units, associated with the numerical field, in the one or more datasets 106 (e.g., a standard error of values indicated by the data units associated with the numerical field), and/or (ix) a margin of error of data units, associated with the numerical field, in the one or more datasets 106 (e.g., a margin of error of values indicated by the data units associated with the numerical field). In some examples, the mean, the median, the standard deviation, the variance coefficient, the standard error and/or the margin of error may be determined by performing one or more operations (e.g., mathematical operations) using data units (e.g., values indicated by the data units), associated with the numerical field, in the one or more datasets 106.

In some examples, the significance metrics 118 may be input to a significance score determination module 120 configured to determine the significance scores 122 associated with the first fields. The significance scores 122 may comprise a significance score for each field of the first fields, such as a first significance score associated with the first field "Field 1" of the one or more datasets 106, a second significance score associated with the second field "Field 2" of the one or more datasets 106, etc. In some examples, the first significance score associated with the first field may be determined based upon the one or more first significance metrics 114 associated with the first field, the second significance score associated with the second field may be determined based upon the one or more second significance metrics 116 associated with the second field, etc. For example, one or more operations (e.g., mathematical operations) may be performed using the one or more first significance metrics 114 to determine the first significance score (e.g., the first significance score may correspond to a sum and/or product of the one or more first significance metrics 114).

In some examples, the significance scores 122 are generated based upon event types (e.g., event categories) of events associated with the one or more datasets 106, and/or may be determined separately for each event type of the event types. The event types associated with the one or more datasets 106 may be determined by categorizing events indicated by the one or more datasets 106 into the event types. The event types may be associated with a plurality of sets of fields of the first fields. For example, a first event type ("Event Type 1" in FIG. 1B) may be associated with a first set of fields of the plurality of sets of fields, a second event type ("Event Type 2" in FIG. 1B) may be associated with a second set of fields of the plurality of sets of fields, etc. Data units associated with the first set of fields may be indicative of events of the first event type, data units associated with the second set of fields may be indicative of events of the second event type, etc.

In an example, the first event type may correspond to "login authentication successful". An event of the first event type may correspond to an event in which login information of a client is successfully authenticated for use in authorizing the client to access one or more resources. The first set of fields (that are associated with events of the first event type) of the first fields may comprise at least one of a field "client identifier", a field "time", a field "authentication type", a field "authorization level", etc. Data units associated with the first set of fields are used to indicate events of the first event type. The one or more datasets 106 may comprise (i) first data units, associated with the first set of fields, that indicate a first event of the first event type, (ii) second data units, associated with the first set of fields, that indicate a second event of the first event type, etc. In an example, the first data units comprise (i) a data unit, associated with the field "client identifier", comprising an identifier of a first client (e.g., an Internet Protocol (IP) address of the first client) that was successfully authenticated in the first event, (ii) a data unit, associated with the field "time", comprising an indication of a time at which the first client was successfully authenticated, (iii) a data unit, associated with the field "authentication type", indicative of a type of authentication performed in the first event (e.g., a protocol used to authenticate the first client), and/or (iv) a data unit, associated with the field "authorization level", indicative of a level of authorization of the first client, such as a level of access the first client has to resources.

In an example, the significance metrics 118 may comprise a plurality of sets of significance metrics. Each set of significance metrics may be associated with an event type, and may comprise significance scores associated with one or more fields associated with the event type. For example, the plurality of sets of significance metrics may comprise a first set of significance metrics 121 associated with the first event type, a second set of significance metrics 123 associated with the second event type, etc. The first set of significance metrics 121 may comprise significance metrics associated with fields of the first set of fields associated with the first event type. In the example shown in FIG. 1B, the first set of significance metrics 121 may comprise at least one of the one or more first significance metrics 114 associated with the first field, the one or more second significance metrics 116 associated with the second field, etc. In an example, the one or more first significance metrics 114 may be determined based upon the first field and a first set of data, of the one or more datasets 106, associated with the first event type (e.g., the first set of data may be event-specific data related to the first event type). For example, the one or more first significance metrics 114 may comprise (i) a quantity of data units, associated with the first field, in the first set of data associated with the first event type, (ii) a quantity of unique values that the first field has in the first set of data, (iii) a measure of data population occurrences associated with the first field and the first set of data during the period of time, (iv) a mean of data units, associated with the first field in the first set of data, (v) a median of data units, associated with the first field, in the first set of data, (vi) a standard deviation of data units, associated with the first field, in the first set of data, (vii) a variance coefficient of data units, associated with the first field, in the first set of data, (viii) a standard error of data units, associated with the first field, in the first set of data, and/or (ix) a margin of error of data units, associated with the first field, in the first set of data.

In some examples, the significance scores 122 may comprise a plurality of sets of significance scores associated with the plurality of sets of fields. For example, the plurality of sets of significance scores may comprise a first set of significance scores associated with the first set of fields and the first event type, a second set of significance scores associated with the second set of fields and the second event type, etc. The first set of significance scores may be determined based upon the first set of significance metrics 121 associated with the first set of fields and the first event type, wherein a significance score of the first set of significance scores may correspond to a significance of a field, of the first set of fields, for the first event type). In an example, a significance score of the first set of significance scores may correspond to a significance of a field (of the first set of fields) for the first event type.

At 206, the second fields (e.g., significant fields) are selected from the first fields based upon the significance scores 122 (e.g., the second fields are selected for use in generating machine learning models for application in data monitoring and/or anomalous event detection). FIG. 1C illustrates selection of the second fields (shown with reference number 126). The significance scores 122 may be input to a field selection module 124 configured to select the second fields 126 from the first fields. In some examples, the second fields 126 may be selected from among the first fields based upon a determination that the second fields 126 are associated with highest significance scores of the significance scores 122. Alternatively and/or additionally, the second fields 126 may be selected from among the first fields based upon a determination that the second fields 126 are associated with k highest significance scores of the significance scores 122 (e.g., fields associated with the k highest significance scores of the significance scores 122 may be included in the second fields 126). In an example where k is 10, 10 fields associated with the 10 highest significance scores of the significance scores 122 may be selected and/or included in the second fields 126. Alternatively and/or additionally, the first fields may be ranked based upon the significance scores 122 (e.g., a field having a higher significance score of the significance scores 122 is ranked higher than a field having a lower significance score of the significance scores 122), and/or the top k ranked fields may be selected from among the first fields (e.g., the top k ranked fields may be included in the second fields 126). Alternatively and/or additionally, the second fields 126 may be selected from among the first fields based upon a determination that the second fields 126 are associated with significance scores (of the significance scores 122) that meet (e.g., exceed) a first threshold significance score (e.g., fields that are associated with significance scores, of the significance scores 122 that do not meet the first threshold significance score, may not be included in the second fields 126). It may be appreciated that determining (e.g., automatically) the significance scores 122 and/or selecting (e.g., automatically) the second fields 126 (based upon the significance scores) for use in generating machine learning models may reduce the amount of data needed to produce the machine learning models.

In some examples, the second fields 126 may be determined based upon the plurality of sets of significance scores. In some examples, a subset of fields (of the second fields 126) associated with an event type may be selected from a set of fields (of the first fields) associated with the event type based upon a set of significance scores (of the plurality of sets of significance scores) that is associated with the set of fields and the event type. For example, (i) a first subset of fields 134 (of the second fields 126) associated with the first event type may be selected from the first set of fields (of the first fields) associated with the first event type based upon the first set of significance scores, (ii) a second subset of fields 136 (of the second fields 126) associated with the second event type may be selected from the second set of fields (of the first fields) associated with the second event type based upon the second set of significance scores, (iii) a third subset of fields 138 (of the second fields 126) associated with a third event type ("Event Type 3" in FIG. 1C) may be selected from a third set of fields (of the first fields) associated with the third event type based upon a third set of significance scores (e.g., the third set of significance scores may be associated with the third set of fields and the third event type), etc. In an example, the first subset of fields 134 (of the second fields 126) may be selected from the first set of fields (of the first fields) by (i) selecting a field (from the first set of fields) for inclusion in the first subset of fields 134 based upon a determination that a significance score (of the first set of significance scores) associated with the field meets (e.g., exceeds) a threshold significance score, (ii) selecting p fields (from the first set of fields) for inclusion in the first subset of fields 134 based upon a determination that the p fields are associated with the top p significance scores of the first set of significance scores, where p may correspond to a defined quantity of significance scores to include in the first subset of fields 134, (iii) and/or other selection technique.

FIG. 3 illustrates a table 300 associated with various fields. The table 300 comprises various columns comprising orig_index column 302 (e.g., an entry in the orig_index column 302 may be indicative of a dataset of the one or more datasets 106), an eventtype column 304 (e.g., an entry in the eventtype column 304 may be indicative of an event type), a field column 306 (e.g., an entry in the field column 306 may be indicative of a field), a type column 308 (e.g., an entry in the type column 308 may be indicative of whether a field is categorized as categorical or numerical), a count column 310 (e.g., an entry in the count column 310 may be indicative of a quantity of data units, associated with a field, in the one or more datasets 106), a distinct count column 312 (e.g., an entry in the distinct count column 312 may be indicative of a quantity of unique values a field has in the one or more datasets 106), a field_occur_per column 314 (e.g., an entry in the field_occur_per column 314 may be indicative of a measure of data population occurrences associated with a field during the period of time), a mean column 316 (e.g., an entry in the mean column 316 may be indicative of a mean of data units of a field, such as a numerical field), a stdev column 318 (e.g., an entry in the stdev column 318 may be indicative of a standard deviation of data units of a field, such as a numerical field), and/or a margin of error column 320 (e.g., an entry in the margin of error column 320 may be indicative of a margin of error of data units of a field, such as a numerical field).

At 208, field combinations are generated based upon the second fields 126. In some examples, a field combination of the field combinations comprises two or more fields of the second fields 126. In some examples, the field combinations are generated based upon the event types (e.g., event categories) of events associated with the one or more datasets 106.

FIG. 1D illustrates generation of the field combinations (shown with reference number 142). The field combinations 142 may be generated using a field combination generation module 140 based upon subsets of fields, of the second fields 126, associated with the event types. The subsets of fields may comprise the first subset of fields 134 associated with the first event type, the second subset of fields 136 associated with the second event type, the third subset of fields 138 associated with the third event type, etc. In some examples, there may be common fields across two or more subsets of the subsets of fields associated with the event types, such as where the first subset of fields 134 associated with the first event type and the second subset of fields 136 associated with the second event type both comprise one or more same fields. Alternatively and/or additionally, one or more events may be associated with (e.g., assigned to) more than one event type of the event types.

The field combinations 142 may comprise one or more first field combinations 144 associated with the first event type, one or more second field combinations 148 associated with the second event type (e.g., each field combination of the one or more second field combinations 148 comprises two or more fields of the second subset of fields 136 associated with the second event type), one or more third field combinations 154 associated with the third event type (e.g., each field combination of the one or more third field combinations 154 comprises two or more fields of the third subset of fields 138 associated with the third event type), etc. In some examples, the one or more first field combinations 144 may comprise a first field combination 146 and/or one or more other field combinations. The first field combination 146 may comprise two or more fields of the first subset of fields 134, such as some and/or all fields of the first subset of fields 134. In some examples, there may be common fields across two or more field combinations of the field combinations 142, such as where the first field combination 146 and one or more other field combinations comprise one or more of the same fields.

In some examples, the field combinations 148 are generated by grouping (e.g., clustering and/or segmenting) the second fields 126 into the field combinations 148. In some examples, numerical fields are grouped into numerical field combinations, of the field combinations 148, that comprise (e.g., consist of) numerical fields. In some examples, categorical fields are grouped into categorical field combinations, of the field combinations 148, that comprise (e.g., consist of) categorical fields. In some examples, fields of the second fields 126 are grouped into field combinations (of the field combinations 148) that comprise numerical fields and categorical fields.

FIG. 4 illustrates a table 400 associated with various field combinations. The table 400 comprises various columns comprising a time column 402, an eventtype column 404 (e.g., an entry in the eventtype column 404 may be indicative of an event type), a model_name column 406 (e.g., an entry in the model_name column 406 may be indicative of a name of one or more machine learning models generated based upon a field combination), a type column 408 (e.g., an entry in the type column 408 may be indicative of whether fields of a field combination are categorized as categorical or numerical), a orig_index column 410 (e.g., an entry in the orig_index column 410 may be indicative of a dataset of the one or more datasets 106), a field combination column 412 (e.g., an entry in the field combination column 412 may be indicative of fields of a field combination), a unique_fields column 414 (e.g., an entry in the unique_fields column 414 may be indicative of a quantity of unique fields in a field combination) and/or an events column 416 (e.g., an entry in the events column 416 may be indicative of a quantity of events associated with fields of a field combination).

At 210, a first plurality of machine learning models is generated based upon the field combinations 142. For each field combination of some and/or all of the field combinations 142, the first plurality of machine learning models may comprise one or more machine learning models generated based upon the field combination. In some examples, the first plurality of machine learning models may comprise one or more first machine learning models associated with (e.g., generated based upon) the first field combination 146 of the field combinations 142, one or more second machine learning models associated with (e.g., generated based upon) a second field combination of the field combinations 142, one or more third machine learning models associated with (e.g., generated based upon) a third field combination of the field combinations 142, etc.

In some examples, the one or more first machine learning models comprises a first machine learning model and/or one or more other machine learning models generated based upon the first field combination 146. For example, the first machine learning model (and/or other machine learning models of the first plurality of machine learning models) may comprise at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform clustering, a machine learning model used to perform gradient boosting, a machine learning model used to perform classification, a neural network machine learning model, etc. In an example in which the one or more first machine learning models comprises multiple machine learning models associated with the first field combination 146, the multiple machine learning models may comprise different types of machine learning models, such as where one machine learning model of the multiple machine learning models comprises a SVM and another machine learning model of the multiple machine learning models comprises a neural network model.

In some examples, a machine learning model of the first plurality of machine learning models may be trained using data units of fields of a field combination associated with the machine learning model. For example, a machine learning model of the one or more first machine learning models (associated with the first field combination 146) may be trained using data units of fields of the first field combination 146, a machine learning model of the one or more second machine learning models (associated with the second field combination) may be trained using data units of fields of the second field combination, etc.

FIG. 1E illustrates generation of the first plurality of machine learning models (shown with reference number 164). The field combinations 142 may be input to a machine learning model generation module 166 configured to generate the first plurality of machine learning models 164. For example, the machine learning model generation module 166 may generate the first machine learning model (shown with reference number 168) based upon the first field combination 146, a second machine learning model 170 based upon the second field combination (shown with reference number 152), a third machine learning model 172 based upon the third field combination (shown with reference number 156), etc. In some examples, the machine learning model generation module 166 may generate the first machine learning model 168 by (i) analyzing the one or more datasets 106 to identify data units associated with fields of the first field combination 146, and/or (ii) training the first machine learning model 168 using the identified data units associated with the fields of the first field combination 146.

In some examples, the first plurality of machine learning models 164 may be selected from among a second plurality of machine learning models (e.g., the first plurality of machine learning models 164 may correspond to a subset of the second plurality of machine learning models). The second plurality of machine learning models may be generated using one or more of the techniques provided herein with respect to generating the first plurality of machine learning models 164.

In some examples, machine learning models, of the second plurality of machine learning models, that meet one or more performance requirements (such as determined via testing the second plurality of machine learning models) may be selected for inclusion in the first plurality of machine learning models 164. In some examples, for each field combination of the field combinations 142, the second plurality of machine learning models may comprise one or more machine learning models generated based upon the field combination. The second plurality of machine learning models may be tested to determine testing results used for selection of the first plurality of machine learning models 164 (e.g., the testing results may correspond to performance parameters associated with the second plurality of machine learning models). For example, the testing results may comprise (i) confidence scores of machine learning models of the second plurality of machine learning models, (ii) variance scores of machine learning models of the second plurality of machine learning models, (iii) margins of error of machine learning models of the second plurality of machine learning models, and/or (iv) coefficients of determination (e.g., r-squared values) of machine learning models of the second plurality of machine learning models.

In some examples, a machine learning model may be selected from the second plurality of machine learning models for inclusion in the first plurality of machine learning models 164 based upon a determination that one or more testing results associated with the machine learning model meets one or more thresholds. For example, the first machine learning model 168 may be included in the first plurality of machine learning models 164 based upon a determination that (i) a confidence score of the first machine learning model 168 meets (e.g., exceeds) a confidence score threshold, (ii) a variance score of the first machine learning model 168 meets (e.g., is less than) a variance score threshold, (iii) a margin of error of the first machine learning model 168 meets (e.g., is less than) a margin of error threshold, (iv) a coefficient of determination of the first machine learning model 168 meets (e.g., exceeds) a coefficient of determination threshold, and/or (v) other testing result determined for the first machine learning model 168 meets a threshold.

Alternatively and/or additionally, one or more thresholds (e.g., at least one of the confidence score threshold, the variance score threshold, the margin of error threshold, the coefficient of determination threshold, etc.) may be set such that at most n machine learning models are included in the first plurality of machine learning models 164. Alternatively and/or additionally, the second plurality of machine learning models may be ranked based upon the testing results, and the top n ranked machine learning models may be included in the first plurality of machine learning models 164. In some examples, n may be based upon a defined compute capacity, such as an available compute capacity for implementing and/or running a machine learning model system (e.g., the machine learning model system 182 in FIG. 1F) comprising the first plurality of machine learning models 164 for anomalous event detection (e.g., automatic anomalous event detection). For example, n may be set to a quantity of machine learning models for which available resources (e.g., at least one of computers, computing power, servers, etc.) are able to run and/or use for data monitoring and/or event detection.

In some examples, prioritization scores associated with machine learning models of the first plurality of machine learning models 164 are determined and/or assigned to the machine learning models based upon the testing results. For example, a first prioritization score associated with the first machine learning model 168 may be determined based upon the confidence score of the first machine learning model 168, the variance score of the first machine learning model 168, the margin of error of the first machine learning model 168, and/or the coefficient of determination of the first machine learning model 168. In an example, one or more operations (e.g., mathematical operations) may be performed using the confidence score, the variance score, the margin of error and/or the coefficient of determination to determine the first prioritization score, where an increase of the confidence score may result in an increase to the prioritization score, a decrease of the variance score may result in an increase to the prioritization score, a decrease of the margin of error may result in an increase to the prioritization score, and/or an increase of the coefficient of determination may result in an increase to the prioritization score. The prioritization scores associated with the first plurality of machine learning models 164 may be used to weight machine learning model outputs (e.g., predictions) of the first plurality of machine learning models 164, such as where a machine learning model output of a machine learning model with a higher prioritization score is given more weight than a machine learning model output of a machine learning model with a lower prioritization score.

FIG. 5 illustrates a table 500 associated with machine learning models. The table 500 comprises various columns comprising an updated column 502 (e.g., an entry in the updated column 502 may be indicative of a time at which a machine learning model was most recently updated), a model_name column 504 (e.g., an entry in the model_name column 504 may be indicative of a name of one or more machine learning models generated based upon a field combination), and/or a title column 506 (e.g., an entry in the title column 506 may be indicative of one or more titles of one or more machine learning models generated based upon a field combination).

At 212, the first plurality of machine learning models 164 is deployed. For example, the first plurality of machine learning models 164 may be deployed in a data monitoring pipeline, such as a real-time data monitoring pipeline. FIG. 1F illustrates deployment of the first plurality of machine learning models 164 in the data monitoring pipeline (shown with reference number 178). The data monitoring pipeline 178 comprises an input data system 180, a machine learning model system 182, and/or an anomalous event detection system 184. Components of the data monitoring pipeline 178 may be connected in series, such as where outputs of the input data system 180 are fed to the machine learning model system 182 and outputs of the machine learning model system 182 are fed to the anomalous event detection system 184. In an example, the machine learning model system 182 comprises the first plurality of machine learning models 164. For example, the first plurality of machine learning models 164 is implemented (e.g., operationalized) in the machine learning model system 182.

The input data system 180 may be configured to retrieve (e.g., extract) data from one or more data sources. The data from the one or more data sources may comprise real-time data. For example, the data may be retrieved by the input data system 180 in real time (e.g., the input data system 180 may be provided with the data by the one or more data sources upon the data becoming available and/or upon the data being generated). Alternatively and/or additionally, the data may be indicative of events, such as real-time events (e.g., the input data system 180 may be provided with the data indicative of the events upon occurrence of the events). The input data system 180 provides the machine learning model system 182 comprising the first plurality of machine learning models 164 with input data 174 comprising the data retrieved from the one or more data sources. For example, the input data system 180 directs data retrieved from the one or more data sources to the machine learning model system 182. Alternatively and/or additionally, the data retrieved from the one or more data sources may be processed (e.g., at least one of formatted, structured, segmented, etc.) to generate the input data 174 provided to the machine learning model system 182.

In some examples, the input data 174 is input to the first plurality of machine learning models 164 in the machine learning model system 182. The first plurality of machine learning models 164 may generate one or more machine learning model outputs 176, using the first plurality of machine learning models 164, based upon the input data 174. In some examples, the first plurality of machine learning models 164 in the machine learning model system 182 comprises tens, hundreds, and/or thousands of machine learning models. In some examples, at least some machine learning models of the first plurality of machine learning models 164 are arranged in parallel, such as shown in and/or described with respect to FIG. 1G. In some examples, at least some machine learning models of the first plurality of machine learning models 164 are arranged in series, as shown in and/or described with respect to FIG. 1H, for example.

FIG. 1G illustrates the machine learning model system 182 according to an embodiment in which the first plurality of machine learning models 164 are arranged in a plurality of branches 187 in the machine learning model system 182. For example, the plurality of branches 187 may be arranged in parallel and/or may comprise a first machine learning model branch 187A comprising one or more first machine learning models A, a second machine learning model branch 187B comprising one or more second machine learning models B, a third machine learning model branch 187C comprising one or more third machine learning models C, etc. In some examples, the machine learning model system 182 may comprise a data routing system 185 configured to route data to branches of the plurality of branches 187. In some examples, the data routing system 185 is configured to route first data A to the one or more first machine learning models A in the first machine learning model branch 187A, second data B to the one or more second machine learning models B in the second machine learning model branch 187B, third data C to the one or more third machine learning models C in the third machine learning model branch 187C, etc.

The data routing system 185 may analyze the input data 174 (from the input data system 180) to select the first data A, the second data B, the third data C, etc. The data routing system 185 may select the first data A (from the input data 174) to be routed to the first machine learning model branch 187A based upon a determination that (i) the first data A is indicative of one or more events having an event type that is associated with the one or more first machine learning models A (e.g., the one or more first machine learning models A are trained based upon one or more field combinations associated with the event type) and/or that (ii) the first data A is associated with (e.g., comprises) data units associated with one or more fields (of the second fields 126, for example) that are used (by the machine learning model generation module 166, for example) to train the one or more first machine learning models A. Alternatively and/or additionally, the data routing system 185 may select the second data B (from the input data 174) to be routed to the second machine learning model branch 187B based upon a determination that (i) the second data B is indicative of one or more events having an event type that is associated with the one or more second machine learning models B and/or that (ii) the second data B is associated with data units associated with one or more fields (of the second fields 126, for example) that are used (by the machine learning model generation module 166, for example) to train the one or more second machine learning models B.

In some examples, different data may be routed to different machine learning model branches of the plurality of branches 187, such as where the first data A (routed to the first machine learning model branch 187A) is different than the second data B (routed to the second machine learning model branch 187B). It may be appreciated that the same data may be routed to different machine learning model branches of the plurality of branches 187, such as where the first data A (routed to the first machine learning model branch 187A) and the third data C (routed to the third machine learning model branch 187C) are the same.

In some examples, each machine learning model branch of the plurality of branches 187 may generate a machine learning model output (e.g., an output of one or more machine learning models in the machine learning model branch). For example, the first machine learning model branch 187A may generate a first machine learning model output A, the second machine learning model branch 187B may generate a second machine learning model output B, the third machine learning model branch 187C may generate a third machine learning model output C, etc. In some examples, machine learning model outputs of the plurality of branches 187 may be weighted machine learning model outputs, such as weighted based upon prioritization scores of machine learning models of the plurality of branches 187. In some examples, the one or more machine learning model outputs 176 may be based upon the machine learning model outputs of the plurality of branches 187. For example, the one or more machine learning model outputs 176 may comprise the machine learning model outputs of the plurality of branches 187 (e.g., the one or more machine learning model outputs 176 output by the machine learning model system 182 may comprise the first machine learning output A, the second machine learning output B, the third machine learning output C, etc. Alternatively and/or additionally, the machine learning model outputs of the plurality of branches 187 may be combined to determine the one or more machine learning model outputs 176. In some examples, operations (e.g., mathematical operations) may be performed using the machine learning model outputs of the plurality of branches 187 to determine the one or more machine learning model outputs 176.

In some examples, arranging machine learning models in parallel (e.g., across the plurality of branches 187) may provide for increased accuracy of the anomalous event detection system 184. The increased accuracy may be due, at least in part, to different machine learning model branches evaluating data from different perspectives and/or with different parameters to generate multiple outputs (associated with the different perspectives and/or the different parameters) that may be used to more accurately identify anomalous events (as compared to identifying anomalous events using merely a single machine learning model output associated with merely a single perspective and/or a single set of parameters).

In some examples, each machine learning model branch of one or more machine learning model branches of the plurality of branches 187 comprises a single machine learning model. In some examples, each machine learning model branch of one or more machine learning model branches of the plurality of branches 187 comprises multiple machine learning models, such as where at least some of the multiple machine learning models in the machine learning model branch are arranged in series and/or at least some of the machine learning models in the machine learning model branch are arranged in parallel. FIG. 1H illustrates the first machine learning model branch 187A according to an example in which the one or more first machine learning models A comprise multiple machine learning models arranged in series. In the example shown in FIG. 1H, the first machine learning model branch 187A comprises two machine learning models (e.g., a machine learning model 1 and a machine learning model 2). However, any number of machine learning models in the first machine learning model branch 187A is contemplated.

In some examples, the one or more machine learning model outputs 176 change over time, such as due, at least in part, to changes in the input data 174 (e.g., real-time data) over time (based upon occurrences of real-time events, for example). The anomalous event detection system 184 may be configured to monitor the one or more machine learning model outputs 176 and/or generate event information 186 based upon the one or more machine learning model outputs 176. In some examples, the anomalous event detection system 184 may monitor the one or more machine learning model outputs 176 for anomalous events, such as an event associated with anomalous (e.g., at least one of abnormal, unusual, threatening, fraudulent, etc.) activity and/or behavior of one or more entities (e.g., users, client devices, network devices, computers, etc.).

At 214, an anomalous event is detected using the first plurality of machine learning models 164. The anomalous event may be detected based upon data (e.g., the input data 174) passing through the data monitoring pipeline 178. For example, the anomalous event may be detected by the anomalous event detection system 184 based upon the one or more machine learning model outputs 176 output by the machine learning model system 182 comprising the first plurality of machine learning models 164. In an example, the event information 186 may be indicative of the anomalous event.

In an example, the machine learning model system 182 may cluster data units from the input data 174 (e.g., real-time data, such as raw data) and/or report anomalous behavior within the input data 174 by including an indication of the anomalous behavior in the one or more machine learning model outputs 176. The anomalous event detection system 184 may use results indicated by the one or more machine learning model outputs 176 for anomalous event detection (to achieve an additional layer of accuracy, for example). The anomalous event detection system 184 may comprise one or more machine learning models. For example, the anomalous event detection system 184 (e.g., the one or more machine learning models) may determine whether anomalous behavior reported by the machine learning model system 182 are actual anomalies (or are just normal operational events that may occur infrequently, for example). Alternatively and/or additionally, the anomalous event detection system 184 may detect suspicious patterns in the one or more machine learning model outputs 176 over long periods of time (e.g., days, weeks, months, etc.).

In some examples, the anomalous event detection system 184 may determine correlations between machine learning model outputs of the one or more machine learning model outputs 176. For example, the anomalous event detection system 184 may perform blind data correlation (and/or blind behavioral analytics) to determine the correlations between the machine learning model outputs. The machine learning model outputs may comprise outputs of at least some machine learning model branches of the plurality of branches 187 (shown in FIG. 1G). For example, the machine learning model outputs may be correlated by one or more attributes, such as common attributes (e.g., fields) that are common across machine learning models of machine learning model branches of the plurality of branches 187. In an example, the one or more attributes comprise at least one of time, identifier (e.g., IP address, client identifier, username, etc.), etc. The anomalous event detection system 184 may detect the anomalous event based upon a change (e.g., an unexpected change) in correlations between the (monitored) machine learning model outputs, such as where a difference between machine learning model outputs is different than an expected difference between the machine learning model outputs.

In some examples, the anomalous event detection system 184 may monitor the machine learning model outputs and determine patterns in the machine learning model outputs accounting for the one or more attributes. In some examples, the input data 174 from the one or more data sources is indicative and/or generated in response to activity performed by entities (e.g., users, client devices, network devices, computers, etc.) operating in a system. The patterns may correspond to patterns of the machine learning model outputs over time that result from behavior (e.g., typical behavior) of the entities in association with the one or more attributes. For example, the patterns may comprise (i) a first pattern of the machine learning model outputs that results from behavior (e.g., typical behavior) of the entities during one or more first defined time periods (e.g., one or more first days of the week, one or more first times of the day, etc.) and/or with one or more first defined identifiers (e.g., one or more first IP addresses, one or more first client identifiers, one or more first usernames, etc.), and (ii) a second pattern of the machine learning model outputs that results from behavior (e.g., typical behavior) of the entities during one or more second defined time periods (e.g., one or more second days of the week, one or more second times of the day, etc.) and/or with one or more second defined identifiers (e.g., one or more second IP addresses, one or more second client identifiers, one or more second usernames, etc.). The first pattern may correspond to at least one of a measure of change in a machine learning model output over time being within a first range of measures of change, the difference between two or more machine learning model outputs being within a first range of differences, etc. In an example, the anomalous event may be detected based upon a determination that a pattern of machine learning model outputs that are generated using the first plurality of machine learning models 164 based upon activity during the one or more first defined time periods and/or with the one or more first defined identifiers is different than the first pattern (e.g., the pattern being different than may indicate that the machine learning model outputs are a result of at least one of abnormal, unusual, threatening, fraudulent, etc. activity and/or behavior of entities in a system).

A machine learning model of the one or more machine learning models (of the anomalous event detection system 184) may comprise at least one of a tree-based model, a machine learning model used to perform linear regression, a machine learning model used to perform logistic regression, a decision tree model, a SVM, a Bayesian network model, a kNN model, a K-Means model, a random forest model, a machine learning model used to perform dimensional reduction, a machine learning model used to perform clustering, a machine learning model used to perform gradient boosting, a machine learning model used to perform classification, a neural network machine learning model, etc. The one or more machine learning models of the anomalous event detection system 184 may be trained and/or updated based upon the one or more machine learning model outputs 176 from the machine learning model system 182. For example, over time, machine learning model training may be performed (in a periodic manner, an aperiodic manner, a continuous manner and/or a real-time manner, for example) on the one or more machine learning models of the anomalous event detection system 184 using updated and/or new data from the machine learning model system 182, thereby improving the performance and/or accuracy of the event information 186 (e.g., indicative of anomalous event predictions) output by the anomalous event detection system 184. Alternatively and/or additionally, the one or more machine learning models of the anomalous event detection system 184 may be generated and/or configured using one or more of the techniques provided herein with respect to the first plurality of machine learning models 164 (e.g., the one or more machine learning models may be trained using the one or more datasets 106 and/or the field combinations 142 and/or may have machine learning models arranged in series, machine learning models arranged in parallel, etc. as shown in and/or described with respect to FIGS. 1G-1H).

In some examples, one or more of the techniques of the present disclosure provides for context-aware machine learning. By determining (e.g., automatically) the field combinations 142 and generating the first plurality of machine learning models 164 based upon the field combinations 142, the input data 174 may be analyzed (e.g., looked at) by the machine learning model system 182 and/or the anomalous event detection system 184 from multiple perspectives corresponding to the field combinations 142, thereby providing for improved (e.g., more accurate) anomalous event detection of the machine learning model system 182 and/or the anomalous event detection system 184 (e.g., with reduced false positives), such as due, at least in part, to the multiple perspectives providing for the machine learning model system 182 and/or the anomalous event detection system 184 being more context aware. Machine learning model outputs produced by at least some machine learning models of the machine learning model system 182 and/or the anomalous event detection system 184 over a period of time (e.g., at least one of 6 months, 1 year, a total duration, etc. in which the machine learning model system 182 and/or the anomalous event detection system 184 operate in the data monitoring pipeline 178) are analyzed to generate (e.g., automatically generate) feedback. The feedback (e.g., feedback indicative of at least one of quality, accuracy, behavior, etc. of the machine learning model outputs produced over the period of time) may be used to train and/or improve (e.g., automatically train and/or improve) machine learning models of the machine learning model system 182 and/or the anomalous event detection system 184, thereby providing for improved (e.g., more accurate) anomalous event detection of the machine learning model system 182 and/or the anomalous event detection system 184 (e.g., with reduced false positives), such as due, at least in part, to the feedback and/or the training and/or improvements to the machine learning models providing for the machine learning model system 182 and/or the anomalous event detection system 184 being more context aware. It may be appreciated that determining the relevance score, selecting relevant entities, generating the feedback based upon the machine learning model outputs over the period of time and/or training and/or improving machine learning models based upon the feedback may create a closed-loop process allowing usage of feedback to tailor parameters of the machine learning model system 182 and/or the anomalous event detection system 184, thereby improving (e.g., continuously improving over time) a quality and/or accuracy of anomalous event detection by the machine learning model system 182 and/or the anomalous event detection system 184. Closed-loop control may reduce errors and produce more efficient operation of a computer system which implements the machine learning model system 182 and/or the anomalous event detection system 184. The reduction of errors and/or the efficient operation of the computer system may improve operational stability and/or predictability of operation. Accordingly, using processing circuitry to implement closed loop control described herein may improve operation of underlying hardware of the computer system.

In some examples, in response to detecting the anomalous event, anomalous event information associated with the anomalous event may be determined and/or the anomalous event information may be included in the event information 186. The anomalous event information may be based upon (i) data, of the input data 174, associated with the anomalous event (e.g., data based upon which the anomalous event is detected using the machine learning model system 182 and/or the anomalous event detection system 184), and/or (ii) the one or more machine learning model outputs 176. The anomalous event information may comprise (i) indications of the data, of the input data 174, associated with the anomalous event, (ii) indications of one or more identifiers (e.g., one or more IP addresses, one or more client identifiers, one or more usernames, etc.) of one or more entities associated with the anomalous event (e.g., the one or more identifiers may be determined based upon the data of the input data 174 and/or based upon the one or more machine learning model outputs 176), and/or (iii) a time of the anomalous event. In some examples, an anomalous event report indicative of the anomalous event may be generated based upon the anomalous event information. The anomalous event report may be indicative of at least some of the anomalous event information. In some examples, the anomalous event report comprises machine readable information and/or human readable information indicative of at least some of the anomalous event information (e.g., the anomalous event information may be decorated with the human readable information). In an example, the anomalous event report may be indicative of contextual information associated with the anomalous event, such as a duration of time that has passed since the last time an event similar to the anomalous event has been detected (e.g., the duration of time being larger than a threshold may convey that the anomalous event is abnormal). The anomalous event report may be transmitted to a device, such as a threat detection device. For example, the anomalous event report may be transmitted by the anomalous event detection system 184 in response to detecting the anomalous event. Alternatively and/or additionally, the anomalous event report may be displayed via an interface (e.g., a threat detection interface) on a device (e.g., a threat detection device). For example, the anomalous event detection system 184 may display the anomalous event report via the interface in response to detecting the anomalous event.

FIG. 1I illustrates the anomalous event detection system 184 transmitting a threat alert 190 to a threat detection device 192 in response to detecting the anomalous event. The threat alert 190 may comprise an indication of the anomalous event. For example, the threat alert 190 may comprise the anomalous event report. In an example, the threat detection device 192 may correspond to a Security Operations Center (SOC) threat detection device and/or a MITRE threat detection device. FIG. 1J illustrates an indication (e.g., a threat notification 194) of the anomalous event being displayed via a client device 100 (e.g., a threat detection device) in response to detecting the anomalous event. In some examples, the anomalous event report may be displayed in response to a selection of the threat notification 194.

It may be appreciated that, in real time and/or automatically, the anomalous event may be detected using the anomalous event detection system 184 and/or the anomalous event report may be generated, transmitted to a device and/or displayed via an interface. Accordingly, one or more actions (e.g., protective and/or corrective actions performed to prevent and/or mitigate a threat) may be performed with increased speed based upon the anomalous event report.

The techniques provided herein with respect to the system 101 and/or the method 200 may be implemented in various environments.

In some examples, the one or more data stores 102 (and/or the one or more datasets 106) and/or the input data 174 may comprise network data. The network data may be indicative of network events of a network (e.g., interactions and/or communications between devices and/or components of the network associated with the system 101 and/or other systems), and/or may be indicative of identifiers of entities (e.g., at least one of users, accounts, devices, components, resources, etc.) associated with the network events. In some examples, the techniques provided herein with respect to the system 101 and/or the method 200 (e.g., at least one of the first plurality of machine learning models 164, the machine learning model system 182, the data monitoring pipeline 178, etc.) may be used for network fault monitoring. For example, the anomalous event may be detected (e.g., automatically and/or in real time) as a result of a malfunction of one or more entities in the network and/or a network outage. Accordingly, using the anomalous event report (indicative of the one or more entities, for example), the one or more entities associated with the malfunction and/or the network outage may be detected, isolated and/or corrected (with increased speed as compared to without using the techniques provided herein, for example).

In some examples, the one or more data stores 102 and/or the input data 174 may comprise security data. The security data may be indicative of security events (e.g., interactions and/or communications between security devices and/or components of the system 101 and/or other systems, such as at least one of security alerts, security messages, etc.), and/or may be indicative of identifiers of entities (e.g., at least one of users, accounts, devices, components, resources, etc.) associated with the security events.

In some examples, the one or more data stores 102 and/or the input data 174 may comprise operational data. The operational data may be indicative of operational events (e.g., operations performed by one or more devices and/or components, such as devices and/or components of the system 101 and/or other systems), and/or may be indicative of identifiers of entities (e.g., at least one of users, accounts, devices, components, resources, etc.) associated with the operational events.

In an example, the system 101 may be associated with a telecommunication service provider. In some examples, the one or more data stores 102 and/or the input data 174 may comprise data associated with the telecommunication services provider. The data may comprise (i) data indicative of cellular events associated with cellular service (e.g., 5G service, 4G service and/or other type of cellular service) provided by the telecommunication service provider (e.g., the cellular events may comprise interactions between devices, such as client devices, base stations, etc.), (ii) data indicative of internet events associated with internet service (e.g., cellular internet service, cable internet, digital subscriber line (DSL) internet service, satellite internet service, 5G internet service, and/or other type of internet service) provided by the telecommunication service provider, (iii) data indicative of resource access events in which resources (e.g., data resources stored on computers, such as servers) are accessed (e.g., accessed by client devices), etc.

In some examples, the anomalous event may be associated with fraudulent activity, malware, a cyber-attack, misconduct, operational misbehavior, etc. performed by one or more entities. In an example, the anomalous event may comprise a cyber-attack on computers of the telecommunication service provider and/or the system 101 and/or may comprise actions performed by malware installed on computers of the system 101. The anomalous event report may be indicative of the one or more entities. In some examples, based upon the indications of the one or more entities (associated with the anomalous event) in the anomalous event report, one or more protective actions may be performed (e.g., the one or more protective actions may be performed automatically). The one or more protective actions may comprise (i) blocking the one or more entities from accessing one or more resources (e.g., including one or more identifiers, such as one or more IP addresses, one or more client identifiers, one or more usernames, etc. of the one or more entities in a list of blacklisted entities and/or blocking network activity of entities in the list of blacklisted entities), (ii) reporting the one or more entities to law enforcement (e.g., transmitting indications of one or more identifiers of the one or more entities to a law enforcement device), (iii) deactivating infected computers, and/or (iv) removing malware installed on the infected computers. Performing the one or more protective actions may mitigate and/or prevent fraudulent and/or malicious activity of the one or more entities.

In an example, the anomalous event may comprise theft, such as embezzlement, from one or more financial accounts by one or more entities (e.g., one or more financial accounts, one or more devices, one or more users, one or more employees, etc.). The anomalous event report may be indicative of the one or more entities (e.g., the anomalous event report may comprise an indication of an account number of a financial account to which stolen funds are attempted to be transferred illegally). In some examples, based upon the indications of the one or more entities (associated with the anomalous event) in the anomalous event report, one or more protective actions may be performed (e.g., the one or more protective actions may be performed automatically). The one or more protective actions may comprise (i) blocking an illegitimate transfer from being performed, (ii) blocking a malicious entity (e.g., a financial account and/or a client device associated with the financial account) associated with the anomalous event from accessing a financial account platform, (iii) blacklisting the financial account, (iv) deactivating the financial account, and/or (v) reporting the financial account to law enforcement. Performing the one or more protective actions may mitigate and/or prevent theft.

In accordance with one or more of the techniques provided herein, the machine learning model system 182 and/or the anomalous event detection system 184 may be implemented to provide services comprising services to protect systems and/or sensitive information from digital attacks (e.g., the machine learning model system 182 and/or the anomalous event detection system 184 may provide cyber security services for protection of systems and/or information), services to protect financial institutions from theft, services to protect companies from employee misconduct and/or misbehavior (e.g., a detected anomalous event may be a result of the employee misconduct and/or misbehavior and/or the detection of the anomalous event may result in the employee being identified, such as by transmitting the threat alert), and/or other services.

Embodiments are contemplated in which the techniques provided herein with respect to the system 101 and/or the method 200 are performed for one or more functions other than (and/or in addition to) anomalous event detection. For example, the first plurality of machine learning models 164 (and/or the machine learning model system 182) may be generated using one or more of the techniques provided herein, and/or may be used for applications other than anomalous event detection, such as at least one of content targeting (e.g., selecting and/or recommending content for different users), marketing (e.g., selecting and/or recommending products and/or services for different users), etc. In an example, the one or more data stores 102 and/or the input data 174 may comprise content activity of various users, such as activity in which users select, consume, interact with, etc. content items using a content platform (e.g., a video platform for consuming and/or sharing videos, an audio platform for consuming and/or sharing audio, a blog, a news platform for consuming and/or sharing news articles, etc.). The first plurality of machine learning models 164 (and/or the machine learning model system 182) may be used to select a content item to present to a user in response to receiving a request for content (e.g., an advertisement request) from the user.

In some examples, one or more of the techniques provided herein (e.g., configuring the data monitoring pipeline 178 and/or machine learning models of the data monitoring pipeline 178 according to arrangements shown in and/or described with respect to FIGS. 1F-1H) results in a multi-tier machine learning model system that provides for improved machine learning model prediction and/or improved detection of anomalous events as compared to using a single-tier machine learning model. For example, implementing the multi-tier machine learning model system and/or monitoring and/or analyzing input data from multiple perspectives (corresponding to the field combinations 142) provides for a higher likelihood that an anomalous event is accurately detected as compared to using a single-tier machine learning model for detection of anomalous events. In an example, the machine learning model system 182 may comprise one or more first tiers of the multi-tier machine learning model system and/or the anomalous event detection system 184 may comprise one or more second tiers of the multi-tier machine learning model system.

In some examples, the one or more data stores 102 and/or data received from one or more data sources may be analyzed to identify data (e.g., new data not included in the one or more datasets 106 used to generate, train and/or implement the first plurality of machine learning models 164). The data may be used to train and/or update (e.g., automatically update) at least some machine learning models of the machine learning model system 182 and/or the anomalous event detection system 184. Alternatively and/or additionally, the data may be used to generate new machine learning models, such as using one or more of the techniques provided herein with respect to generating the first plurality of machine learning models 164. In an example, the data may be used to generate the new machine learning models if the data comprises a new type of data different than the one or more datasets 106 (e.g., the data is indicative of events associated with event types different than event types associated with events indicated by the one or more datasets 106). In some examples, the new machine learning models are deployed in the data monitoring pipeline 178 (e.g., in the machine learning model system 182 and/or in the anomalous event detection system 184) and/or are used to monitor for and/or detect anomalous events.

Figure 6:
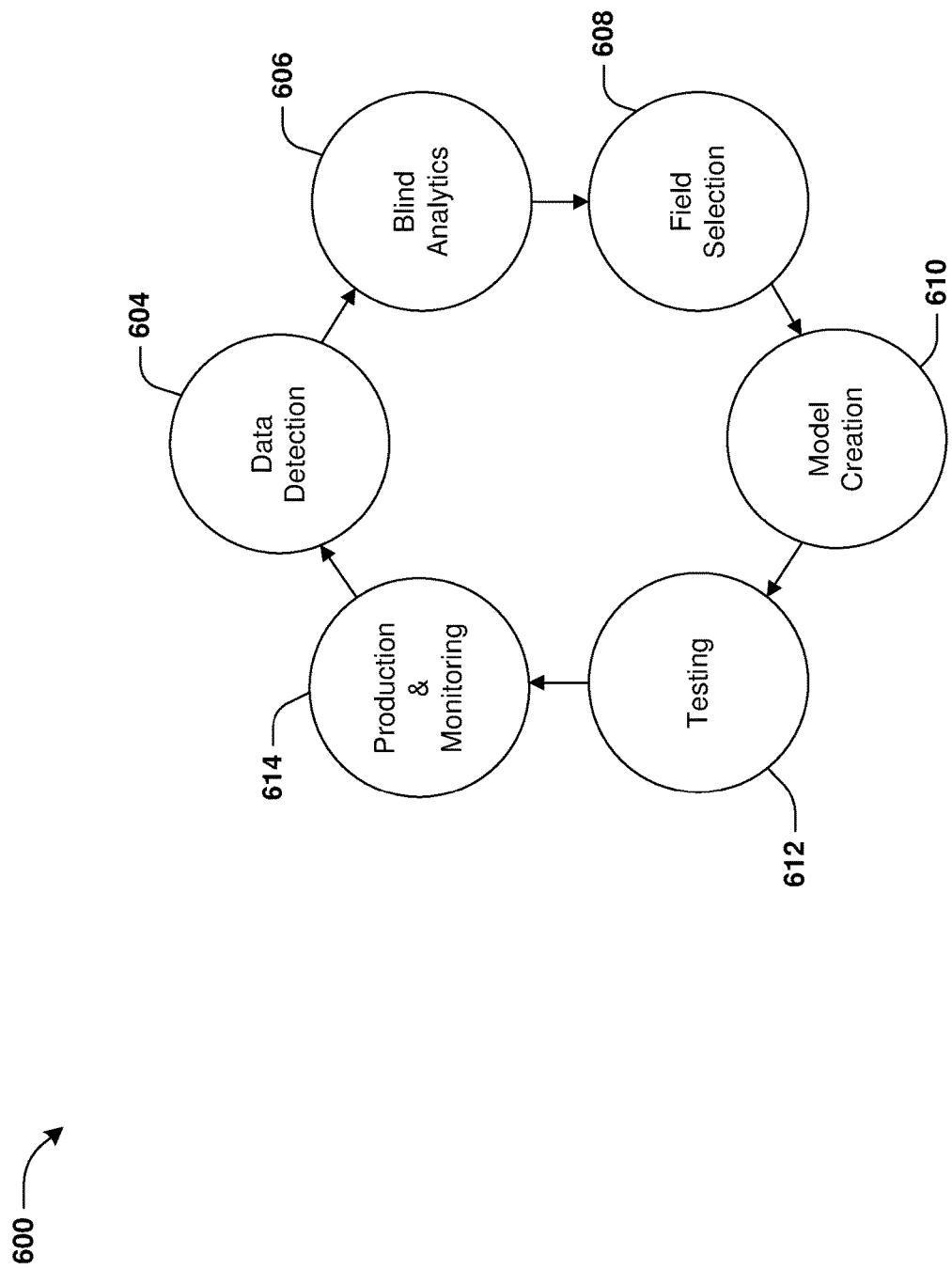
FIG. 6 is a flow chart illustrating an example method for an autonomous machine learning process according to some embodiments.

In some examples, one, some and/or all of the operations provided herein may be performed (e.g., repeated) in an autonomous machine learning process. The autonomous machine learning process may be performed in a periodic manner (e.g., once per week, once per month, etc.) and/or in an aperiodic manner (e.g., in response to an event, such as an event comprising at least one of detecting data added to the one or more data stores 102, receiving data from one or more data sources, detecting and/or receiving a new type of data, etc.). FIG. 6 illustrates an example method 600 of the autonomous machine learning process. In some examples, the autonomous machine learning process may comprise (i) performing data detection 604 (e.g., at least one of detecting data added to the one or more data stores 102, receiving data from one or more data sources, detecting and/or receiving a new type of data, etc.), (ii) performing blind analytics 606 on the data detected at 604 (e.g., identifying fields in the data using one or more of the techniques provided herein with respect to identifying the first fields and/or determining significance scores associated with the fields using one or more of the techniques provided herein with respect to determining the significance scores 122), (iii) performing field selection 608 (e.g., selecting fields using one or more of the techniques provided herein with respect to selecting the second fields 126), (iv) performing model creation 610 (e.g., generating machine learning models based upon the selected fields and/or data units of the selected fields using one or more of the techniques provided herein with respect to generating the first plurality of machine learning models 164) and/or training and/or updating at least some machine learning models of the machine learning model system 182 and/or the anomalous event detection system 184 based upon the selected fields and/or data units of the selected fields, (v) performing machine learning model testing 612 (e.g., using one or more of the techniques provided herein with respect to testing the second plurality of machine learning models) and/or determining prioritization scores associated with generated machine learning models based upon resultant testing results, and/or (vi) performing production and/or monitoring 614 (e.g., deploying generated machine learning models in the data monitoring pipeline 178 and/or monitoring input data using the deployed machine learning models).

Some and/or all of the operations provided herein may be performed in an automatic manner and/or without human intervention, unless otherwise specified.

Figure 7:
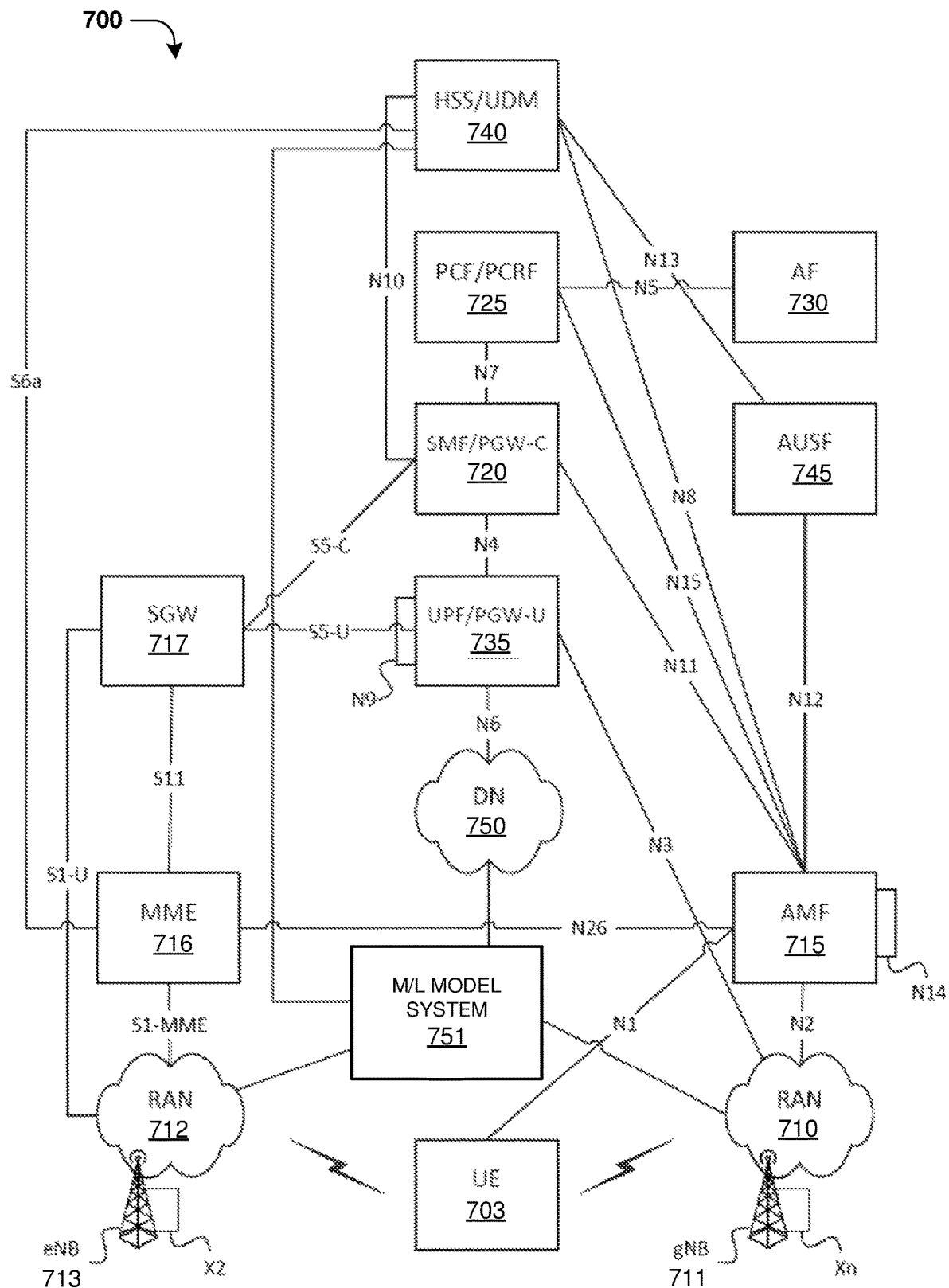
FIG. 7 is an illustration of an example environment in which at least a portion of the techniques presented herein may be utilized and/or implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 703, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as machine learning model system 751.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively and/or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 703 may include a computation and communication device, such as a wireless mobile communication device that is capable of communicating with RAN 710, RAN 712, and/or DN 750. UE 703 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 703 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 703 may communicate with one or more other elements of environment 700. UE 703 may communicate with RAN 710 via an air interface (e.g., as provided by gNB 711). For instance, RAN 710 may receive traffic (e.g., voice call traffic, data traffic, messaging traffic, signaling traffic, etc.) from UE 703 via the air interface, and may communicate the traffic to UPF/PGW-U 735, and/or one or more other devices or networks. Similarly, RAN 710 may receive traffic intended for UE 703 (e.g., from UPF/PGW-U 735, AMF 715, and/or one or more other devices or networks) and may communicate the traffic to UE 703 via the air interface.

RAN 712 may be, or may include, a LTE RAN that includes one or more base stations (e.g., one or more eNBs 713), via which UE 703 may communicate with one or more other elements of environment 700. UE 703 may communicate with RAN 712 via an air interface (e.g., as provided by eNB 713). For instance, RAN 710 may receive traffic (e.g., voice call traffic, data traffic, messaging traffic, signaling traffic, etc.) from UE 703 via the air interface, and may communicate the traffic to UPF/PGW-U 735, and/or one or more other devices or networks. Similarly, RAN 710 may receive traffic intended for UE 703 (e.g., from UPF/PGW-U 735, SGW 717, and/or one or more other devices or networks) and may communicate the traffic to UE 703 via the air interface.

AMF 715 may include one or more devices, systems, Virtualized Network Functions ("VNFs"), etc., that perform operations to register UE 703 with the 5G network, to establish bearer channels associated with a session with UE 703, to hand off UE 703 from the 5G network to another network, to hand off UE 703 from the other network to the 5G network, manage mobility of UE 703 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 703 with the EPC, to establish bearer channels associated with a session with UE 703, to hand off UE 703 from the EPC to another network, to hand off UE 703 from another network to the EPC, manage mobility of UE 703 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 703. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 703, from DN 750, and may forward the user plane data toward UE 703 (e.g., via RAN 710, SMF/PGW-C 720, and/or one or more other devices). In some embodiments, multiple UPFs 735 may be deployed (e.g., in different geographical locations), and the delivery of content to UE 703 may be coordinated via the N9 interface (e.g., as denoted in FIG. 7 by the line marked "N9" originating and terminating at UPF/PGW-U 735). Similarly, UPF/PGW-U 735 may receive traffic from UE 703 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 703.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 703 may communicate, through DN 750, with data servers, other UEs UE 703, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 703 may communicate.

The machine learning model system 751 may include one or more devices, systems, VNFs, etc., that perform one or more operations described herein, such as one or more operations described with respect to at least one of the input data system 180, the machine learning model system 182, the anomalous event detection system 184, the data monitoring pipeline 178, the system 101, the method 200, the method 600, etc.

Figure 8:
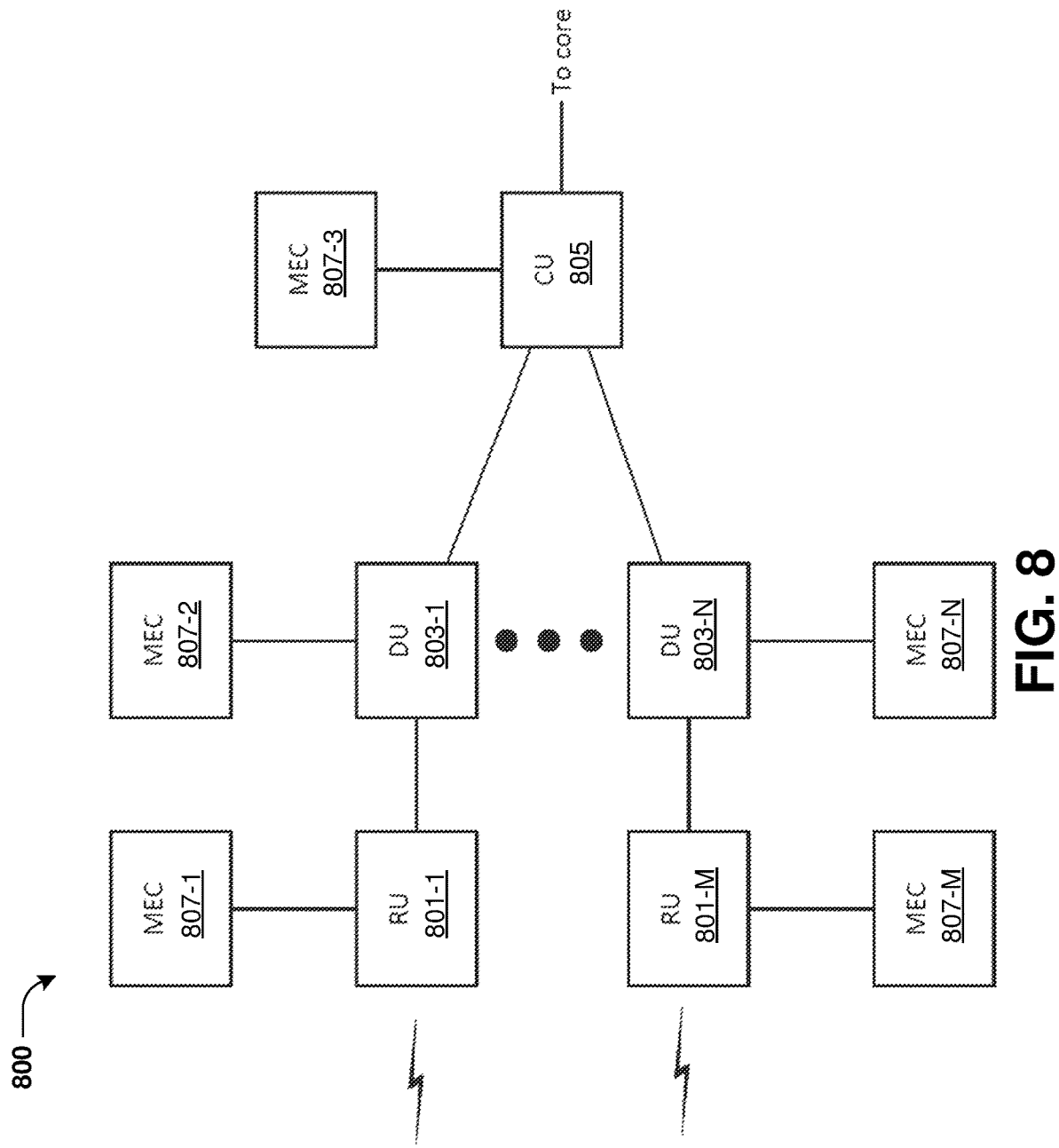
FIG. 8 is an illustration of an example network that may utilize and/or implement at least a portion of the techniques presented herein.

FIG. 8 illustrates an example Distributed Unit ("DU") network 800, which may be included in and/or implemented by one or more RANs (e.g., RAN 810, RAN 812, or some other RAN). In some embodiments, a particular RAN may include one DU network 800. In some embodiments, a particular RAN may include multiple DU networks 800. In some embodiments, DU network 800 may correspond to a particular gNB 811 of a 5G RAN (e.g., RAN 810). In some embodiments, DU network 800 may correspond to multiple gNBs 811. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs UE 803 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based upon the RLC packets) on the traffic received from DUs 803.

In accordance with some embodiments, CU 805 may receive downlink traffic (e.g., traffic from the core network) for a particular UE 803, and may determine which DU(s) 803 should receive the downlink traffic. DU 803 may include one or more devices that transmit traffic between a core network (e.g., via CU 805) and UE 803 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 803.

RU 801 may include hardware circuitry (e.g., one or more RF transceivers, antennas, radios, and/or other suitable hardware) to communicate wirelessly (e.g., via an RF interface) with one or more UEs UE 803, one or more other DUs 803 (e.g., via RUs 801 associated with DUs 803), and/or any other suitable type of device. In the uplink direction, RU 801 may receive traffic from UE 803 and/or another DU 803 via the RF interface and may provide the traffic to DU 803. In the downlink direction, RU 801 may receive traffic from DU 803, and may provide the traffic to UE 803 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 803, via a respective RU 801.

For example, RU 801-1 may route some traffic, from UE 803, to MEC 807-1 instead of to a core network (e.g., via DU 803 and CU 805). MEC 807-1 may process the traffic, perform one or more computations based upon the received traffic, and may provide traffic to UE 803 via RU 801-1. In this manner, ultra-low latency services may be provided to UE 803, as traffic does not need to traverse DU 803, CU 805, and an intervening backhaul network between DU network 800 and the core network. In some embodiments, MEC 807 may include, and/or may implement some or all of the functionality described above with respect to at least one of the input data system 180, the machine learning model system 182, the anomalous event detection system 184, the data monitoring pipeline 178, the machine learning model system 751, the system 101, the method 200, the method 600, etc.

Figure 9:
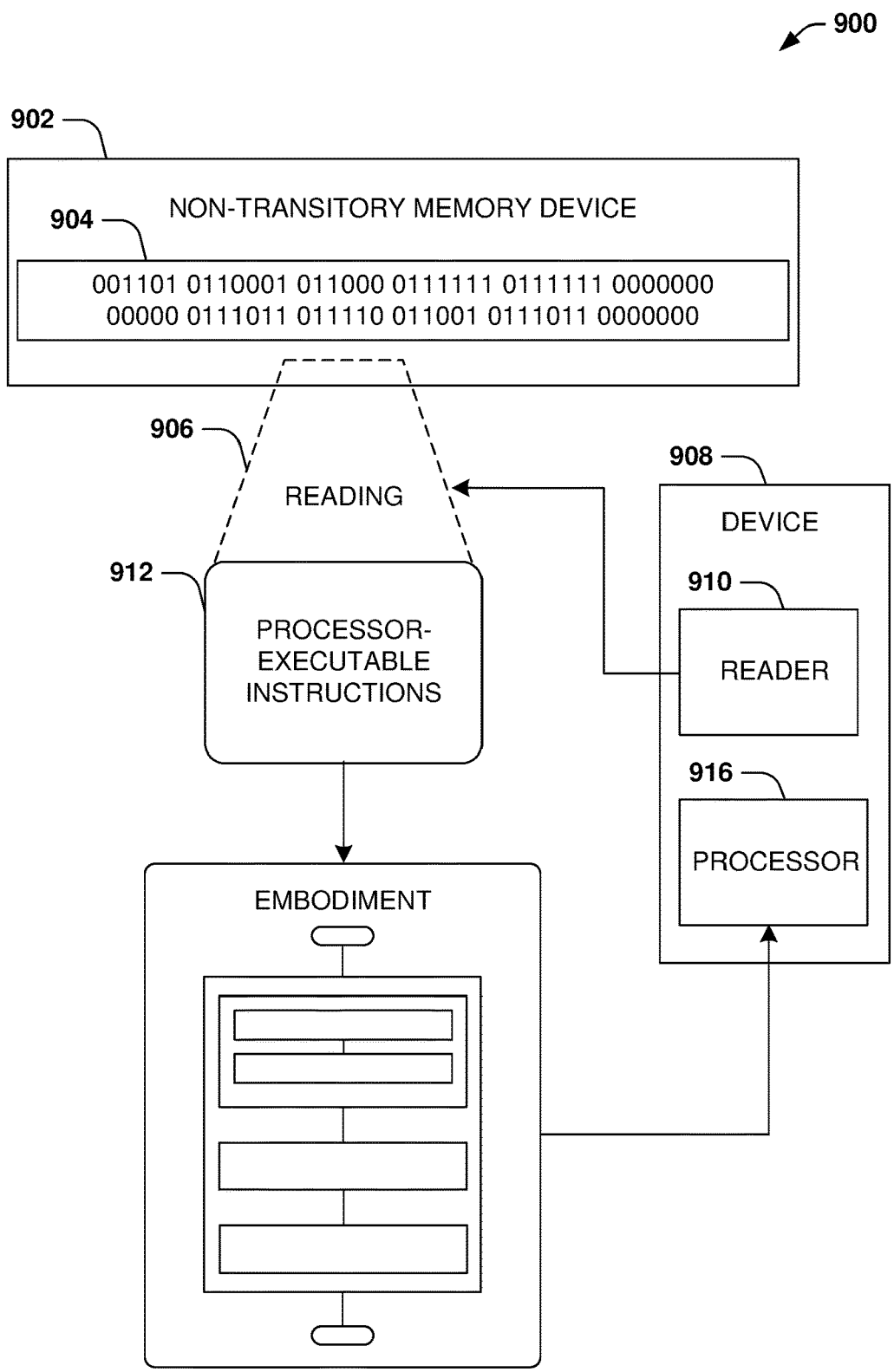
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2 and/or the example method 600 of FIG. 6, for example. In some embodiments, the processor-executable instructions 912 are configured to cause implementation of a system, such as at least some of the example system 101 of FIGS. 1A-1J, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   identifying one or more datasets having first fields;
   determining significance scores associated with the first fields;
   selecting second fields, from the first fields, based upon the significance scores;
   generating field combinations based upon the second fields;
   generating, based upon the field combinations, a plurality of machine learning models comprising:
      a first machine learning model associated with a first field combination of the field combinations; and
      a second machine learning model associated with a second field combination of the field combinations;
   deploying the plurality of machine learning models in a real-time data monitoring pipeline; and
   detecting, using the plurality of machine learning models, an anomalous event based upon network data, indicative of one or more network events of a network, passing through the real-time data monitoring pipeline.

2. The method of claim 1, comprising:
   in response to detecting the anomalous event, transmitting an indication of the anomalous event to a threat detection device.

3. The method of claim 1, comprising:
   in response to detecting the anomalous event, displaying an indication of the anomalous event via a threat detection interface on a threat detection device.

4. The method of claim 1, wherein determining the significance scores comprises:
   determining a first significance score associated with a first field of the first fields based upon at least one of:
      a quantity of first data units, associated with the first field, in the one or more datasets;
      a measure of data, of the one or more datasets, associated with the first field;
      a mean of data units, associated with the first field, in the one or more datasets;
      a median of data units, associated with the first field, in the one or more datasets;
      a standard deviation of data units, associated with the first field, in the one or more datasets;
      a variance coefficient of data units, associated with the first field, in the one or more datasets;

a standard error of data units, associated with the first field, in the one or more datasets; or a margin of error of data units, associated with the first field, in the one or more datasets.

5. The method of claim 1, comprising:
determining a plurality of event types, associated with the second fields, comprising:
a first event type of first events associated with a first subset of fields of the second fields; and
a second event type of second events associated with a second subset of fields of the second fields,
wherein:
the first field combination is associated with the first event type;
the second field combination is associated with the second event type; and
generating the field combinations comprises:
determining the first field combination based upon the first subset of fields; and
determining the second field combination, that is associated with the second event type, based upon the second subset of fields.

6. The method of claim 5, wherein generating the plurality of machine learning models comprises:
training the first machine learning model of the plurality of machine learning models using data units of fields of the first field combination; and
training the second machine learning model of the plurality of machine learning models using data units of fields of the second field combination.

7. The method of claim 1, wherein:
the first field combination comprises a first field and a second field; and
the second field combination comprises the first field and a third field.

8. The method of claim 1, wherein generating the plurality of machine learning models comprises:
generating a second plurality of machine learning models based upon the field combinations;
testing the second plurality of machine learning models to determine testing results; and
selecting the plurality of machine learning models from the second plurality of machine learning models based upon the testing results.

9. The method of claim 8, wherein the testing results comprise at least one of:
a confidence score of the first machine learning model;
a variance score of the first machine learning model;
a margin of error of the first machine learning model; or
a coefficient of determination of the first machine learning model.

10. The method of claim 1, wherein:
generating the plurality of machine learning models comprises:
testing the plurality of machine learning models to determine testing results; and
assigning prioritization scores to the plurality of machine learning models based upon the testing results; and
detecting the anomalous event comprises:
determining machine learning model outputs, of the plurality of machine learning models, based upon the data passing through the real-time data monitoring pipeline;
weighting the machine learning model outputs according to the prioritization scores to generate weighted machine learning model outputs; and
identifying the anomalous event based upon the weighted machine learning model outputs.

11. The method of claim 1, wherein:
the one or more datasets are identified based upon a determination that the one or more datasets are associated with events within a period of time.

12. The method of claim 11, comprising:
determining the period of time randomly.

13. The method of claim 11, comprising:
receiving an indication of the period of time, wherein determining the period of time is based upon the indication.

14. A non-transitory computer-readable medium storing instructions that when executed perform operations comprising:
identifying one or more datasets having first fields;
determining significance scores associated with the first fields;
selecting second fields, from the first fields, based upon the significance scores;
generating field combinations based upon the second fields;
generating, based upon the field combinations, a plurality of machine learning models comprising:
a first machine learning model associated with a first field combination of the field combinations; and
a second machine learning model associated with a second field combination of the field combinations;
deploying the plurality of machine learning models in a real-time data monitoring pipeline; and
detecting, using the plurality of machine learning models, an anomalous event based upon data passing through the real-time data monitoring pipeline.

15. The non-transitory computer-readable medium of claim 14, the operations comprising:
in response to detecting the anomalous event, transmitting an indication of the anomalous event to a threat detection device.

16. The non-transitory computer-readable medium of claim 14, the operations comprising:
in response to detecting the anomalous event, displaying an indication of the anomalous event via a threat detection interface on a threat detection device.

17. The non-transitory computer-readable medium of claim 14, wherein determining the significance scores comprises:
determining a first significance score associated with a first field of the first fields based upon at least one of:
a quantity of first data units, associated with the first field, in the one or more datasets;
a measure of data, of the one or more datasets, associated with the first field;
a mean of data units, associated with the first field, in the one or more datasets;
a median of data units, associated with the first field, in the one or more datasets;
a standard deviation of data units, associated with the first field, in the one or more datasets;
a variance coefficient of data units, associated with the first field, in the one or more datasets;
a standard error of data units, associated with the first field, in the one or more datasets; or
a margin of error of data units, associated with the first field, in the one or more datasets.

18. The non-transitory computer-readable medium of claim 14, the operations comprising:

determining a plurality of event types, associated with the second fields, comprising:
a first event type of first events associated with a first subset of fields of the second fields; and
a second event type of second events associated with a second subset of fields of the second fields,
wherein:
the first field combination is associated with the first event type;
the second field combination is associated with the second event type; and
generating the field combinations comprises:
determining the first field combination based upon the first subset of fields; and
determining the second field combination, that is associated with the second event type, based upon the second subset of fields.

19. The non-transitory computer-readable medium of claim 18, wherein generating the plurality of machine learning models comprises:
training the first machine learning model of the plurality of machine learning models using data units of fields of the first field combination; and
training the second machine learning model of the plurality of machine learning models using data units of fields of the second field combination.

20. A device comprising:
a memory; and
a processor coupled to the memory, the processor configured to execute instructions to perform operations comprising:
identifying one or more datasets having first fields;
determining significance scores associated with the first fields;
selecting second fields, from the first fields, based upon the significance scores;
generating field combinations based upon the second fields;
generating, based upon the field combinations, a plurality of machine learning models comprising:
a first machine learning model associated with a first field combination of the field combinations; and
a second machine learning model associated with a second field combination of the field combinations;
deploying the plurality of machine learning models in a data monitoring pipeline; and
detecting, using the plurality of machine learning models, an anomalous event based upon data passing through the data monitoring pipeline.

* * * * *